US012765518B2

(12) United States Patent
Haarburger

(10) Patent No.: US 12,765,518 B2
(45) **Date of Patent: *Oct. 20, 2026**

(54) TREAT RETAINING PET TOY

(71) Applicant: Woof Pet, Inc., Denver, CO (US)

(72) Inventor: Daniel Haarburger, Boulder, CO (US)

(73) Assignee: Woof Pet Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/293,524

(22) Filed: Aug. 7, 2025

(65) Prior Publication Data

US 2026/0033458 A1 Feb. 5, 2026

Related U.S. Application Data

(63) Continuation of application No. 19/293,488, filed on Aug. 7, 2025, which is a continuation of application No. 18/077,165, filed on Dec. 7, 2022, now Pat. No. 12,402,601.

(60) Provisional application No. 63/268,400, filed on Feb. 23, 2022.

(51) Int. Cl.
*A01K 15/02* (2006.01)

(52) U.S. Cl.
CPC .................................. *A01K 15/026* (2013.01)

(58) Field of Classification Search
CPC .. A01K 15/026; A01K 15/025; A01K 5/0114; A01K 5/015; A01K 5/0128
See application file for complete search history.

(56) References Cited

U.S. PATENT DOCUMENTS

| | | | |
|---|---|---|---|
| 5,947,061 | A | 9/1999 | Markham |
| D776,371 | S | 1/2017 | Tome |
| D786,513 | S | 5/2017 | Tome |

(Continued)

FOREIGN PATENT DOCUMENTS

| | | | |
|---|---|---|---|
| WO | 2004043142 | A1 | 5/2004 |

OTHER PUBLICATIONS

Amazon.com: 7 Pack Dog Treat Molds, Puppy Dog Paw and Bone Molds, Non-stick Dog Ice Molds Trays, first accessed Jul. 24, 2024, product first available Dec. 25, 2018, https://www.amazon.com/Non-stick-Reusable-Chocolate-Biscuits-perfect/dp/ B07M66LNQ1/ref=asc_df_B07M66LNQ1?tag=bingshoppinga-20&linkCode=d (Year: 2018).

(Continued)

*Primary Examiner* — Ebony E Evans
(74) *Attorney, Agent, or Firm* — Benesch Friedlander Coplan & Aronoff LLP

(57) ABSTRACT

A pet toy and method for occupying a pet. In one embodiment, the pet toy comprises a cylindrical main body member including a top end having a top wall, a bottom end opposite the top end that is open, and an annular side wall between the top end and the bottom end. The pet toy further comprises a core member configured to insert into the bottom end of the cylindrical main body member, and having a treat container configured to contain a pet treat. The top wall of the cylindrical main body member includes a treat access hole facing toward the treat container when the core member is inserted into the cylindrical main body member, and further includes one or more vents that serve multiple functions including relieving suction forces during use and redirecting saliva into the pet toy to prevent unwanted mess.

20 Claims, 20 Drawing Sheets

(56) References Cited

U.S. PATENT DOCUMENTS

| | | | | |
|---|---|---|---|---|
| 9,961,880 | B2 | 5/2018 | Simon | |
| 9,999,199 | B1 * | 6/2018 | Dadalto | A01K 15/021 |
| 10,085,422 | B1 | 10/2018 | Tsengas | |
| D845,562 | S | 4/2019 | Lewis et al. | |
| D848,683 | S | 5/2019 | Pinto et al. | |
| 10,285,380 | B1 | 5/2019 | Mullin | |
| D871,687 | S | 12/2019 | Mou | |
| 10,582,696 | B1 | 3/2020 | Mullin | |
| D910,247 | S | 2/2021 | Wilson et al. | |
| 11,246,293 | B2 | 2/2022 | Wolfe, Jr. et al. | |
| 11,363,801 | B1 * | 6/2022 | Steinkraus | A01K 15/025 |
| 11,464,208 | B2 * | 10/2022 | Weller | A01K 15/026 |
| D994,243 | S | 8/2023 | Wu | |
| D1,007,079 | S | 12/2023 | Wu | |
| D1,050,635 | S * | 11/2024 | He | D30/160 |
| D1,050,637 | S * | 11/2024 | Chen | D30/160 |
| D1,082,175 | S * | 7/2025 | Zhu | D21/713 |
| 12,342,793 | B1 * | 7/2025 | Mullin | A01K 15/026 |
| 12,402,601 | B2 * | 9/2025 | Haarburger | A01K 15/025 |
| D1,099,434 | S | 10/2025 | Toolan | |
| 2009/0211537 | A1 | 8/2009 | Bertsch | |
| 2011/0083608 | A1 * | 4/2011 | Markham | A01K 5/0114 119/51.01 |
| 2011/0239949 | A1 | 10/2011 | Abbott | |
| 2012/0325157 | A1 * | 12/2012 | Lipscomb | A01K 5/0142 119/52.1 |
| 2013/0247836 | A1 | 9/2013 | Axelrod | |
| 2014/0270931 | A1 * | 9/2014 | Jager | A01K 15/025 403/343 |
| 2016/0081305 | A1 | 3/2016 | Williams et al. | |
| 2016/0174527 | A1 | 6/2016 | Campbell et al. | |
| 2019/0098864 | A1 | 4/2019 | Simon | |
| 2020/0113152 | A1 | 4/2020 | Mcfarlane | |
| 2020/0281160 | A1 * | 9/2020 | Crane | A01K 15/026 |

OTHER PUBLICATIONS

Amazon.com: Starmark Everlasting Treat Ball Large with 1 treat, accessed Jan. 2, 2024, product first date available Oct. 2, 2001 (Year: 2001 ), https://www.amazon.com/StarMark-Everlasting-Treat-Ball-Large/dp/B0012V1GOY/ref=sr_1_6?crid= 178LH8ET2M15L &dib=eyJ2ljoiMSJ9. ik5e715DAQDFs2yLMUOPuNcgt6XOXGITpVgS12Fsey.

* cited by examiner

TREAT RETAINING PET TOY

RELATED APPLICATIONS

This application is a continuation of U.S. patent application Ser. No. 19/293,488, filed Aug. 7, 2025, which is a continuation of U.S. patent application Ser. No. 18/077,165, filed Dec. 7, 2022, which claims priority to provisional application 63/268,400, filed on Feb. 23, 2022, the entireties of all of which are herein incorporated by reference.

FIELD

The disclosure relates to the field of accessories for animals or pets, and in particular, to a pet toy for pets.

BACKGROUND

Domestic animals are capable of providing a great deal of emotional fulfillment and support for their caretakers. However, many domestic animals (referred to generally herein as pets) demand a substantial amount of attention from their caretaker, especially while that caretaker is physically present. Thus, it remains difficult for a caretaker to balance other activities with the demands of a pet. This issue has only been exacerbated by recent trends increasing the prevalence of remote work and after-hours work in modern society. During work, a caretaker may be required to spend time attending to other tasks than mollifying a pet. However, the mere presence of the caretaker may increase the very desire and demand of the pet for attention.

Hence, those who care for pets continue to desire devices for entertaining those pets while also carving out additional free time.

SUMMARY

Embodiments described herein provide enhanced devices for retaining edible articles in a manner that is accessible, but also time-consuming, for a pet (e.g., a dog) to acquire. Devices as described herein are generally referred to as pet toys, and the edible articles are generally referred to as treats or pet treats. The pet toys described herein are re-usably separable by a caretaker into individual components or members. This enables a treat to be loaded into a treat container of the pet toy while the individual members are separated. When the individual members are joined, the treat is trapped in the treat container, but a pet has access to the pet treat through a treat access hole. Thus, the pet may interact with the pet treat via smell and taste, but is incapable of instantly devouring the treat as it is trapped in the treat container.

Pet toys and methods described herein provide a benefit by drawing the attention of a pet for an extended period of time as the pet attempts to consume a pet treat. This in turn grants caretakers additional free time to pursue their own goals while the pet is occupied.

In an embodiment, a pet toy comprises a cylindrical main body member comprising a top end having a top wall, a bottom end opposite the top end that is open, and an annular side wall between the top end and the bottom end. The pet toy further comprises a core member configured to insert into the bottom end of the cylindrical main body member, and having a treat container configured to contain a pet treat. The top wall of the cylindrical main body member includes a treat access hole facing toward the treat container when the core member is inserted into the cylindrical main body member. The top wall of the cylindrical main body member further includes one or more vents.

In an embodiment, the treat access hole is radially centered on the top wall of the cylindrical main body member, and a plurality of the vents are disposed radially outward from the treat access hole.

In an embodiment, the annular side wall projects axially outward in relation to the top wall where the annular side wall and the top wall intersect to form an annular rim.

In an embodiment, the annular rim slopes axially inward toward the vents.

In an embodiment, the cylindrical main body member further comprises a plurality of grooves disposed axially along the annular side wall.

In an embodiment, the core member comprises a top end that is open, a bottom end opposite the top end that is closed at a base, and an annular side wall between the top end and the bottom end of the core member. An inner side surface and an inner bottom surface of the core member forms the treat container.

In an embodiment, the treat container is generally bowl-shaped.

In an embodiment, the treat container is configured to contain a liquid.

In an embodiment, contact between the cylindrical main body member and the core member forms a liquid seal between the cylindrical main body member and the core member when the core member is inserted into the cylindrical main body member.

In an embodiment, the base comprises an annular flange that abuts the bottom end of the cylindrical main body member when the core member is inserted into the cylindrical main body member.

In an embodiment, the top wall of the cylindrical main body member is rounded axially outward, and the base of the core member is rounded axially outward.

In an embodiment, a center of gravity of the pet toy is disposed closer to the base than the top end of the cylindrical main body member to bias the top wall of the cylindrical main body member upward.

In an embodiment, the core member comprises a grip disposed on the base configured to be grasped by a human hand.

In an embodiment, a kit comprises as pet toy as described above, and the pet treat having a dimension larger than a dimension of the treat access hole so that the top wall of the cylindrical main body member traps the pet treat in the treat container of the core member.

In an embodiment, a kit comprises the pet toy as described above, and a mold configured to shape the pet treat having a dimension larger than a dimension of the treat access hole so that the top wall of the cylindrical main body member traps the pet treat in the treat container of the core member.

In an embodiment, a pet toy comprises an upper member and a lower member that are detachable. The upper member defines a hollow cylinder, and comprises a top end having a top wall, a bottom end opposite the top end that is open, and an annular side wall between the top end and the bottom end. The lower member is configured to screw into the bottom end of the upper member, and includes a liquid-impermeable treat container configured to contain a pet treat. The top wall of the upper member is configured to trap the pet treat in the treat container when the lower member is screwed into the upper member, and includes a treat access hole and a plurality of vents.

In an embodiment, the treat access hole is radially centered on the top wall of the upper member, and the vents are disposed radially outward from the treat access hole.

In an embodiment, the annular side wall projects axially outward in relation to the top wall where the annular side wall and the top wall intersect to form an annular rim, and the annular rim slopes axially inward toward the vents.

In an embodiment, contact between the upper member and the lower member forms a liquid seal between the upper member and the lower member when the lower member is screwed into the upper member.

In an embodiment, a method of occupying a pet comprises obtaining a pet toy as described above, obtaining a pet treat, loading the pet treat in the treat container of the core member with the core member detached from the cylindrical main body member, and inserting the core member into the bottom end of the cylindrical main body member so that the treat access hole is facing toward the treat container. The top wall of the cylindrical main body member traps the pet treat in the treat container while providing access to the pet treat through the treat access hole.

Other illustrative embodiments may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description depict specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
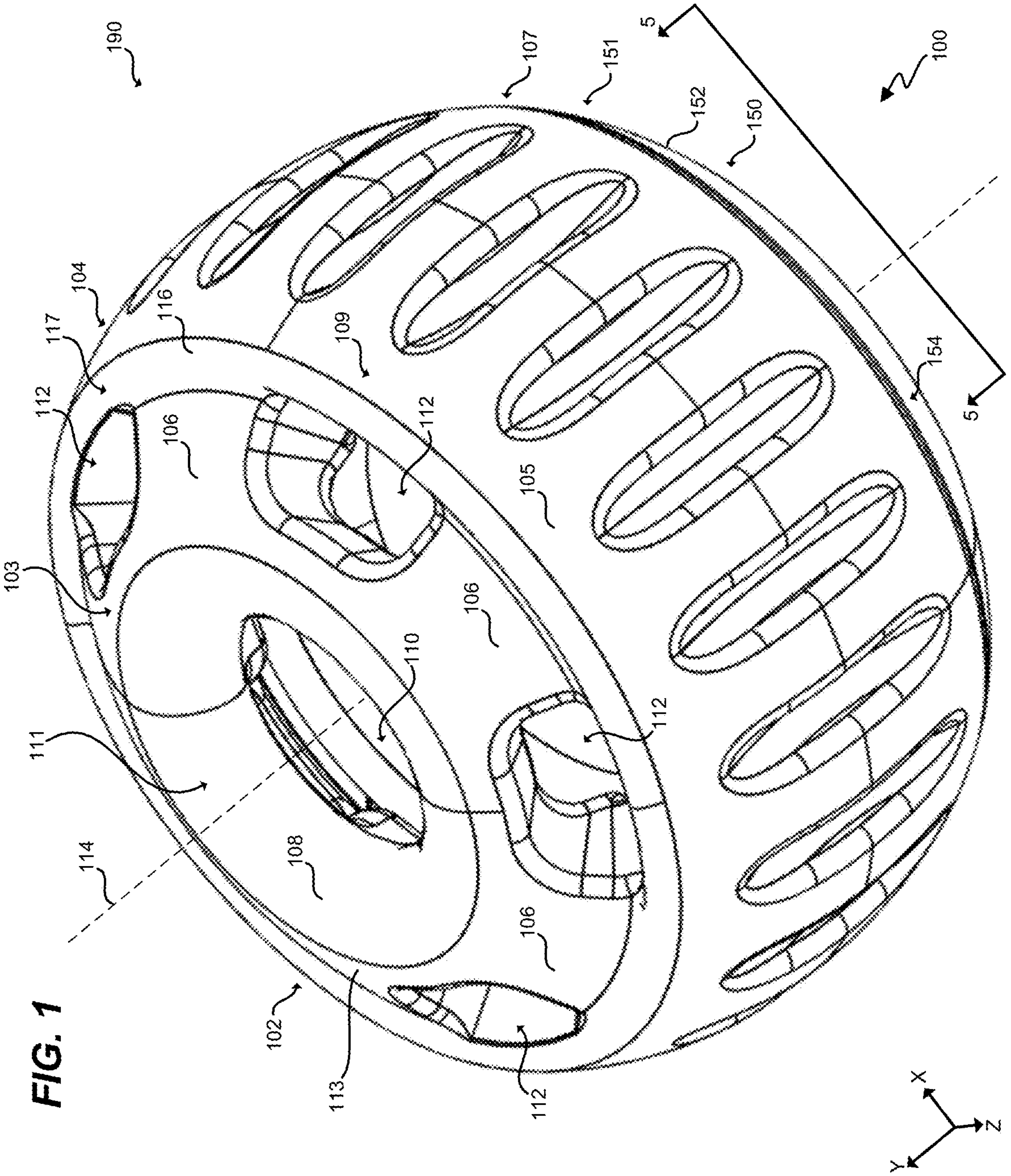
FIG. 1 is a perspective view of a pet toy configured to retain a pet treat in an illustrative embodiment.

FIG. 1 is a perspective view of a pet toy 100 configured to retain a pet treat in an illustrative embodiment. Pet toy 100 is an apparatus, object, or device designed for a pet, such as a dog. Pet toy 100 is enhanced to removably store a pet treat in a manner that prevents, hinders, or obstructs a pet from fully retrieving or extracting the pet treat from pet toy 100. At the same time, pet toy 100 grants limited access for a pet to reach the pet treat (e.g., by the pet extending its tongue into pet toy 100) via a treat access hole 110. This keeps the pet entertained for a longer period of time than would be granted by a treat dispenser or a simple toy. For example, the pet may use its tongue to abrade the pet treat trapped in the pet toy 100, and consume the pet treat over a long period of time, such as thirty to forty minutes. Pet toy 100 may be scaled to any suitable size for a pet. For example, pet toy 100 intended for use by dogs may have a circumference of about $3\pi$ inches, $3.5\pi$ inches, etc.

In this embodiment, pet toy 100 comprises an upper member 102 and a lower member 150 that are detachable or separable into individual components. Upper member 102 and lower member 150 are configured to be repeatedly detached from, and attached to, each other in order to assemble pet toy 100. This enables pet toy 100 to be opened or disassembled for replacement of a pet treat and/or for cleaning. Pet toy 100 may further be closed or assembled to prevent, hinder, or obstruct pet treats from being quickly retrieved or extracted from pet toy 100 by a pet. Upper member 102 and lower member 150 are arranged about a center axis 114 proceeding in the Y direction. In this embodiment, center axis 114 occupies a center of cross-sections of pet toy 100 along the XZ plane.

Upper member 102 (also referred to as a cylindrical main body member) comprises a main body member of pet toy 100, and is generally cylindrical in shape. Upper member 102 is a monolithic body that includes a top end 103, a bottom end 107, and an annular side wall 105 between the top end 103 and the bottom end 107. Annular side wall 105 provides physical support and strength to pet toy 100 that prevents pet toy 100 from being damaged, crushed, or separated by a pet. For example, annular side wall 105 may be dimensioned for sufficient structural strength to resist crushing by the jaws of a pet. In an embodiment, annular side wall 105 is made from a pliable or flexible material 109, such as a rubber (e.g., a silicone rubber), that resists damage and permanent deformation. Flexible material 109 may also be soft enough to ensure that the teeth of a pet are not damaged by interaction with the flexible material 109.

An outer surface 104 of annular side wall 105 may exhibit a curvature, such as a convex curvature, between top end 103 and bottom end 107. In other words, outer surface 104 of annular side wall 105 may curve radially outward between top end 103 and bottom end 107 around the circumference of annular side wall 105. A curvature of outer surface 104 facilitates rolling, bouncing, or other dynamic action when pet toy 100 is thrown, nudged, kicked, or butted.

Bottom end 107 of upper member 102 is open to receive lower member 150 as will be described in more detail below. Top end 103 of upper member 102 is partially closed to define a treat interaction portion 111. Treat interaction portion 111 is the portion of pet toy 100 that serves dual purposes of trapping a pet treat in pet toy 100, and allows a pet to interact with a pet treat trapped or contained in pet toy 100. Treat interaction portion 111 is formed by a top wall 113 on top end 103. In one embodiment, top wall 113/treat interaction portion 111 includes a treat access hole 110. Treat access hole 110 is an opening, orifice, or void in top wall 113 that provides a pet access to a pet treat. Treat access hole 110 is dimensioned to allow passage or penetration of a pet tongue into an interior of pet toy 100. Thus, treat access hole 110 is wide enough for a dog tongue or another type of pet. Treat access hole 110 is circular in this embodiment, but may have other shapes in other embodiments, such as an oval. Also, a single treat access hole 110 is shown in the embodiment of FIG. 1, but more than one treat access hole 110 may be implemented on top wall 113 in other embodiments.

Top wall 113/treat interaction portion 111 further includes one or more vents 112. A vent 112 is an opening, slot, orifice, or void in top wall 113 disposed on the same top end 103 as treat access hole 110 (i.e., distinct from treat access hole 110). A size or dimension of vents 112 are smaller than a size or dimension of treat access hole 110. Vents 112 may be generally rectangular in shape (as opposed to a circular shape of treat access hole 110), although other shapes are considered herein. The size and/or shape of vents 112 may be selected to prevent penetration of a pet tongue into an interior of pet toy 100 through vents 112. In one embodiment, treat access hole 110 may be disposed toward a center of top wall 113 (i.e., centered on center axis 114), with vents 112 disposed radially outward from treat access hole 110. Vents 112 are configured to relieve back pressure in pet toy 100 when treat access hole 110 is plugged by the tongue of a pet. Vents 112 therefore provide a technical benefit by preventing a suction lock from occurring when a pet inserts its tongue into treat access hole 110 to reach a pet treat within an interior of pet toy 100. That is, vents 112 enable airflow into pet toy 100 from the same end as treat access hole 110 even when treat access hole 110 is entirely blocked by a tongue, which prevents the tongue from becoming trapped within pet toy 100 by a pressure differential. Vents 112 also provide a function of saliva or drool capture, which is discussed in more detail below.

Although the structure of the top wall 113 of upper member 102 may vary, top wall 113 may include buttresses 106 (also referred to herein as "supports") that project radially inward from annular side wall 105 towards the center axis 114, and project axially outward in the Y direction in relation to annular side wall 105. Top wall 113 may further include a ring 108, which defines treat access hole 110 from an exterior 190 of pet toy 100 to an interior portion of pet toy 100. In further embodiments, buttresses 106 may vary in thickness, and may comprise supports that are thick enough to appear as a continuous ring interrupted by vents 112.

In an embodiment, annular side wall 105 may project axially outward in relation to the top wall 113 where annular side wall 105 and the top wall 113 intersect to form an annular rim 116. Annular rim 116 slopes or curves axially inward toward vents 112 of top wall 113. Thus, annular rim 116 defines an annular trough 117 along top wall 113 that facilitates the redirection of saliva or drool on top wall 113 toward vents 112, as discussed with regard to FIG. 4 below. In addition to preventing a suction lock, vents 112 also function as an inlet for saliva or drool into an interior portion of pet toy 100.

Lower member 150 (also referred to as a core member or plug member) is generally cylindrical in shape. Lower member 150 comprises a top end (not visible in FIG. 1), a bottom end 151 opposite the top end that is closed at a base 152, and an annular side wall (not visible in FIG. 1) between the top end and the bottom end 151. Base 152 of lower member 150 represents the bottom of pet toy 100 that rests on a floor when pet toy 100 is oriented upright with top end 103 facing upward. As will be described in more detail below, an interior portion of lower member 150 forms a treat container. Lower member 150 may be made from the flexible material 109 or a rigid material 154 (e.g., a plastic). In an embodiment, base 152 is curved or rounded axially outward or generally has a spherical or rounded outline, which enables pet toy 100 to roll when dropped or thrown. This increases the entertainment value of pet toy 100, which may be used by the pet in a similar manner to a ball.

Figure 2:
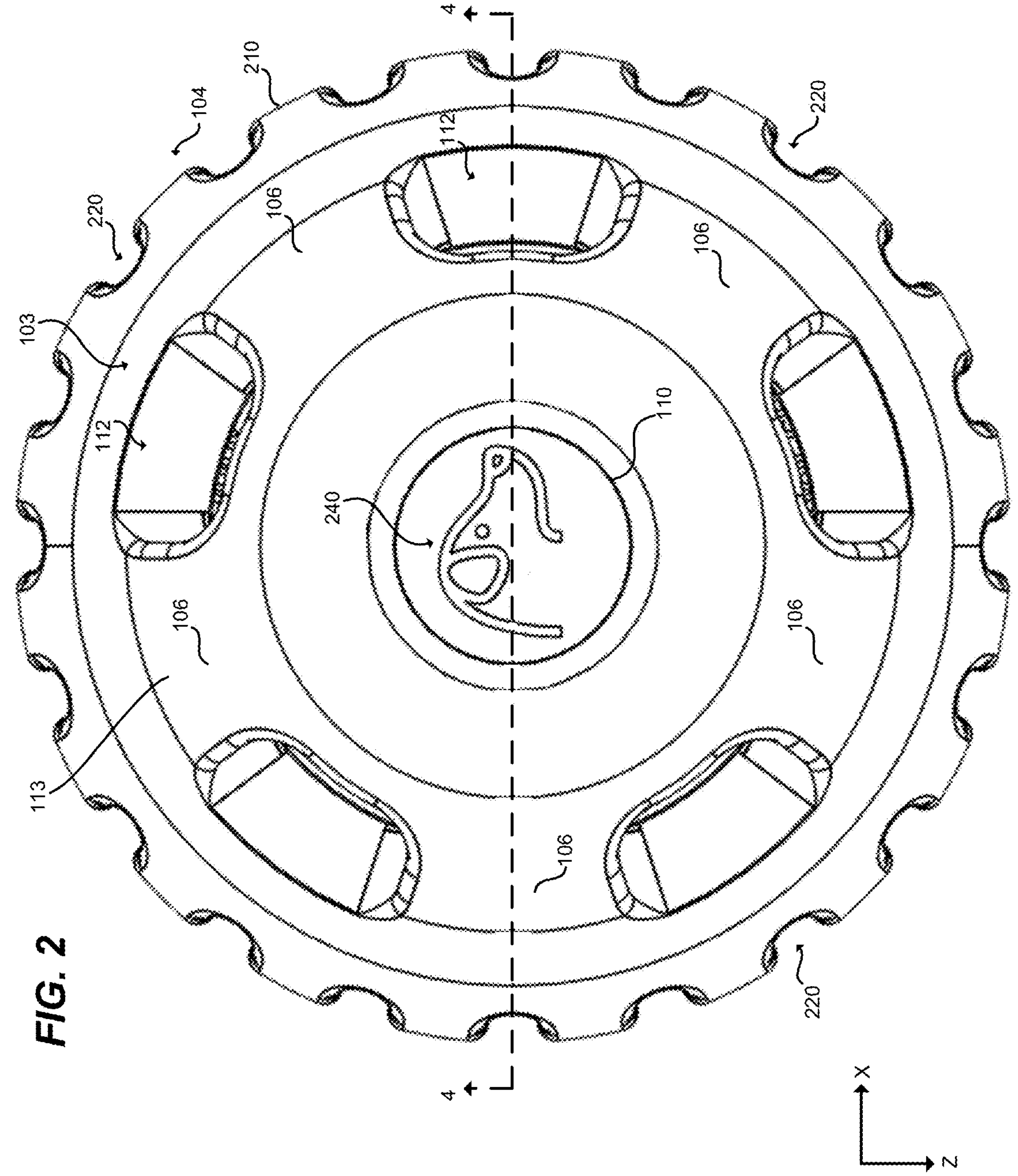
FIG. 2 is a top view of the pet toy in an illustrative embodiment.

FIG. 2 is a top view of pet toy 100 in an illustrative embodiment. FIG. 2 illustrates top wall 113 and treat interaction portion 111 having an arrangement of treat access hole 110 and vents 112. In one embodiment, vents 112 may be spaced circumferentially around top wall 113 and separated by buttresses 106. Although five vents 112 are shown in FIG. 2, a different number of vents 112 may be implemented in other embodiments. Treat access hole 110 may be disposed generally toward a center 240 of top wall 113, and may curve or slope axially inward toward center 240.

Furthermore, FIG. 2 illustrates that an outer surface 104 of annular side wall 105 may include one or more grooves 220 disposed radially inward from outer surface 104. Grooves 220 extend or are disposed generally vertical or axial on outer surface 104 along the Y-axis, and may be referred to as vertical grooves. However, in other embodiments, grooves 220 may extend at an angle to the Y-axis. Grooves 220 may be circumferentially arranged about outer surface 104 as shown in FIG. 2. Grooves 220 provide multiple technical benefits. First, the addition of grooves 220 causes motion of pet toy 100 to become more erratic when thrown or rolled, which may cause pet toy 100 to appear more enticing for a pet to pursue. Second, the use of grooves 220 facilitates gripping of pet toy 100 by a human. This makes the process of separating and re-joining upper member 102 and lower member 150 more ergonomic, particularly in embodiments where the upper member 102 and the lower member 150 are mated. Third, the existence of grooves 220 facilitates the cleaning of teeth of a pet when pet toy 100 is chewed or gnawed by the pet. Although outer surface 104 is described as having one or more grooves 220, the outer surface 104 may have different types of surface features, such as one or more ridges 210 that project radially outward from outer surface 104, a plurality of bumps arranged on outer surface 104 (see, for example, FIG. 12), etc. Alternatively, outer surface 104 may be generally smooth in other embodiments (see, for example, FIG. 14).

Figure 3:
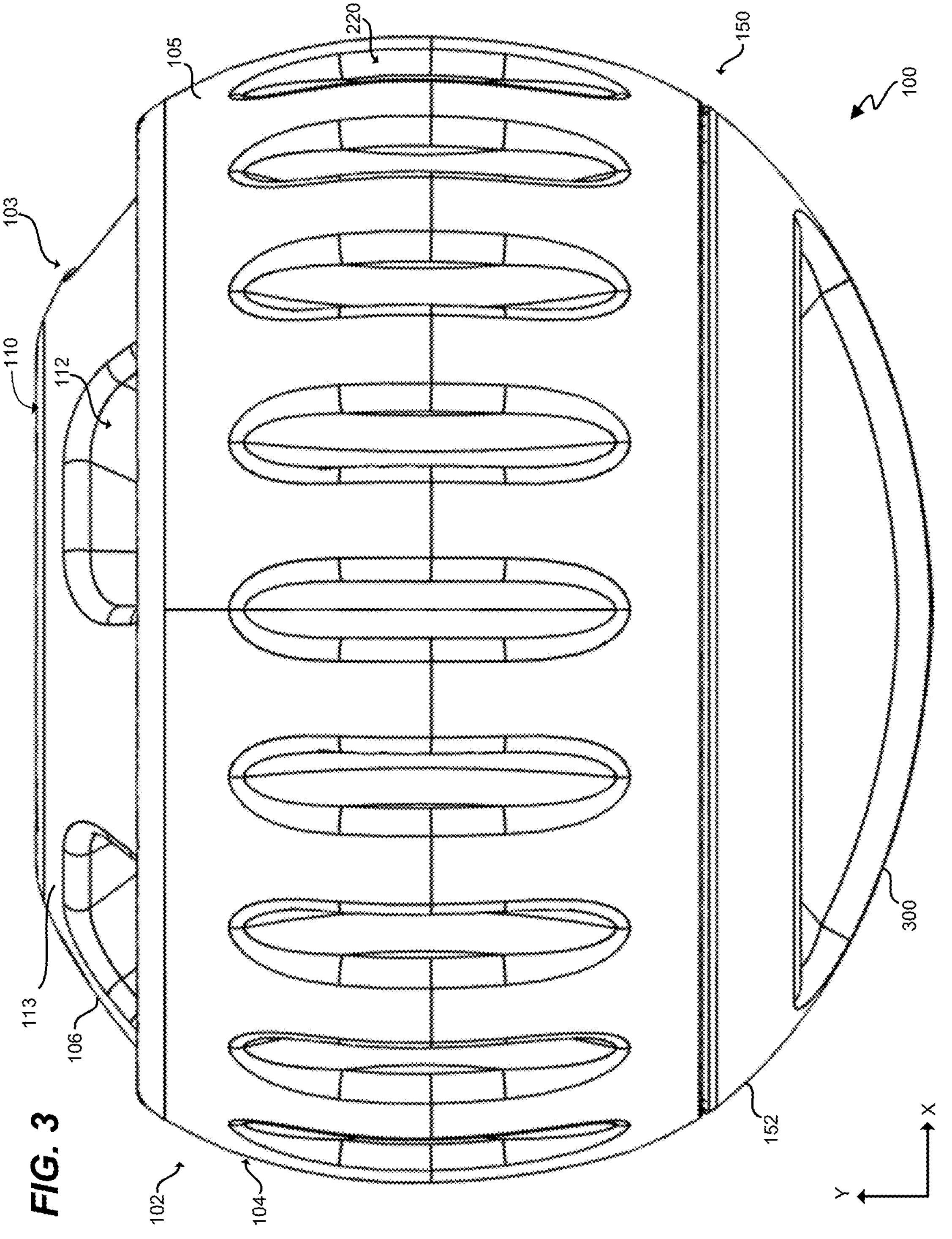
FIG. 3 is a side view of the pet toy in an illustrative embodiment.

FIG. 3 is a side view of pet toy 100 in an illustrative embodiment. As is evident, top wall 113 of upper member 102 may be curved or rounded axially outward, and base 152 of lower member 150 may be curved or rounded axially outward in the opposite direction. Likewise, outer surface 104 of annular side wall 105 of upper member 102 may be curved or rounded radially outward. FIG. 3 further illustrates a geometry and distribution of grooves 220 around outer surface 104 of upper member 102. FIG. 3 also provides further detail of lower member 150, and illustrates a grip 300 disposed on base 152 of lower member 150. Grip 300 is a surface feature on base 152 configured to be grasped by a human hand, such as a handle. Grip 300 may be used for coupling and de-coupling the lower member 150 to/from the upper member 102. For example, by holding the upper member 102 via grooves 220 in one hand and holding the grip 300 of lower member 150 in the other hand, a caretaker may ergonomically apply torque that joins/separates the lower member 150 and the upper member 102.

Figure 4:
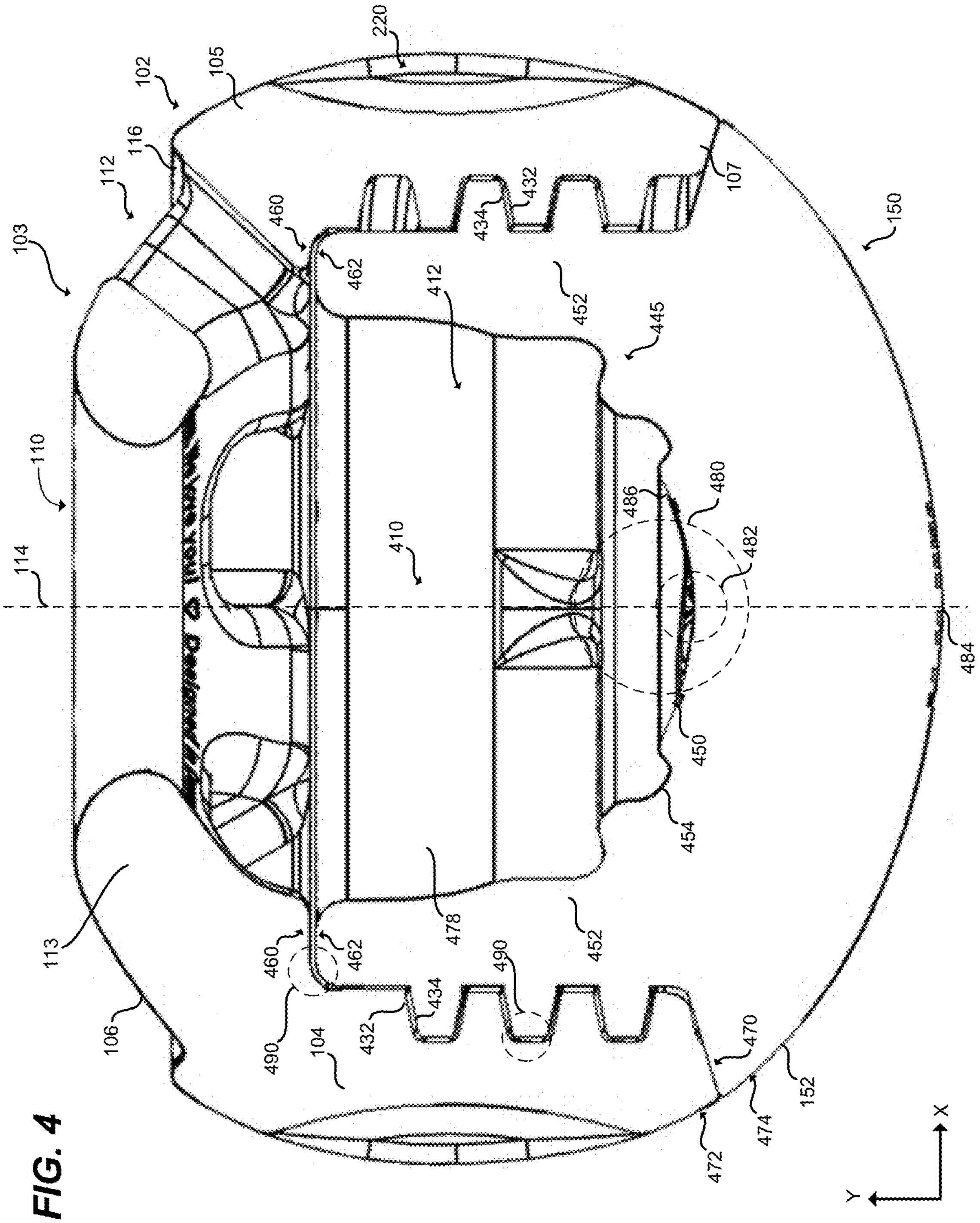
FIG. 4 is a section cut view of the pet toy in an illustrative embodiment.

FIG. 4 is a section cut view of pet toy 100 in an illustrative embodiment, and corresponds with view arrows 4-4 of FIG. 2. In an embodiment, where annular side wall 105 and top wall 113 of upper member 102 intersect, annular side wall 105 may extend or project axially outward from top wall 113 to form annular rim 116. Annular rim 116 may slope or curve radially inward towards the vents 112, which provides a technical benefit by capturing and re-directing saliva that is flowing along top wall 113. Annular rim 116 redirects the saliva into an interior portion 412 of pet toy 100 and into a treat container 410 that contains the pet treat, instead of onto the outer surface 104 of upper member 102. Treat container 410 is configured to hold or contain liquid so the saliva is contained within pet toy 100 resulting in less of a mess. This also prevents the outer surface 104 from becoming overly slick, which may interfere with the disassembly of pet toy 100, as well as the handling of pet toy 100 when used as a ball or toy.

FIG. 4 depicts the annular side wall 452 of lower member 150 in an illustrative embodiment. The annular side wall 452 of lower member 150 is generally cylindrical and dimensioned to mate (i.e., fit into) with annular side wall 105 of upper member 102. In one embodiment, annular side wall 452 may include threads 434 on an outer side surface, while annular side wall 105 includes threads 432 on an inner side surface. In this embodiment, threads 432 and 434 are dimensioned to mate when lower member 150 is screwed (i.e., united by means of a twisting motion) into upper member 102. However, in other embodiments, other mating features, such as magnets, interlocking teeth, a zipper, a button, interlocking ridges, etc., may be utilized to securely hold lower member 150 when lower member 150 is inserted in upper member 102 to allow for repeated assembly and disassembly of the lower member 150 to/from the upper member 102.

In one embodiment, treat container 410 is defined by an interior portion of lower member 150. A treat container 410 is an internal cavity or compartment within lower member 150 that is configured to contain a pet treat. Treat container 410 may be generally bowl-shaped 445 that is open at its top, and has a continuous inner side surface 478 and a continuous inner bottom surface 486. Treat container 410 is configured to hold or contain a liquid (i.e., liquid impermeable), meaning that treat container 410 is devoid of holes on inner side surface 478 or inner bottom surface 486 so that liquid cannot flow out of treat container 410 axially through inner bottom surface 486 or radially out of inner side surface 478. When assembled as in FIG. 4, treat access hole 110 is facing toward treat container 410. Treat access hole 110 may be considered as being in axial alignment with treat container 410 when pet toy 100 is assembled, where treat access hole 110 is substantially aligned axially with treat container 410. One technical benefit is a frozen pet treat or the like may be contained in treat container 410, and liquid melting from the frozen pet treat cannot escape treat container 410 other than through top wall 113. Another technical benefit is saliva captured in treat container 410 cannot escape other than through top wall 113.

In one embodiment, treat container 410 may include a central depression 450 at inner bottom surface 486. Treat container 410 may further include one or more peripheral depressions 454 arranged radially outward from central depression 450 at inner bottom surface 486. Central depression 450 and/or peripheral depression 454 function to trap at least a portion of a pet treat to extend playtime by the pet. In further embodiments, the number, depth, arrangement, and even existence of the various depressions of treat container 410 may be varied as a matter of design choice.

Additional features of pet toy 100 may facilitate sealing of upper member 102 and lower member 150 so that liquid cannot escape or leak between these members. In general, a liquid seal 490 may be formed between upper member 102 and lower member 150 due to contact between upper member 102 and lower member 150 when lower member 150 is inserted into upper member 102. For example, with lower member 150 tightened or fully inserted/fully screwed into upper member 102, a liquid-tight or liquid-proof seal 490 may be formed between upper member 102 and lower member 150. For example, an annular lip 460 of upper member 102 may abut an upper surface 462 of annular side wall 452 of lower member 150 when upper member 102 and lower member 150 are joined. Annular lip 460 may project radially inward with respect to threads 432 to abut upper surface 462 of annular side wall 452. Additionally or alternatively, a liquid seal 490 may be formed via engagement of threads 432 with threads 434, when threads are implemented as mating features. A liquid seal 490 provides a technical benefit by preventing liquid from penetrating or leaking between lower member 150 and upper member 102. Further, preventing penetration of liquid between threads 432 and threads 434 ensures that upper member 102 and lower member 150 do not loosen with respect to each other, and also reduces the need for washing the threads 432 and 434 between uses.

An additional feature illustrated by FIG. 4 is a flange 470 at the base 152 of lower member 150. Flange 470 projects radially outward with respect to annular side wall 452 to abut the bottom end 107 of upper member 102. The outermost portion of flange 470 is generally flush with outer surface 104 of annular side wall 105. Thus, the outermost portion of flange 470 extends a contour 472 of the outer surface 104, such that the contour 472 continues substantially smoothly into a contour 474 at the base 152 of lower member 150. This provides a technical benefit by facilitating rolling of pet toy 100 when pet toy 100 is perturbed.

FIG. 4 further illustrates that pet toy 100 may exhibit a biased center of gravity. That is, a center of gravity 482 of pet toy 100 might not be disposed at a geometric center of pet toy 100. Rather, the center of gravity 482 may be disposed closer to a lower surface 484 of the base 152 than top end 103 of upper member 102, such as within volume 480. This causes pet toy 100 to roll erratically, which may be enticing to a pet. Furthermore, offsetting the center of gravity 482 causes pet toy 100 to bias the top wall 113/treat interaction portion 111 (i.e., treat access hole 110) upward when pet toy 100 is rolled, and after pet toy 100 has finished moving. When biased upward, the bottom of pet toy 100 rests on the floor with top end 103 facing upward, which helps to ensure that the treat access hole 110 remains accessible to the pet after pet toy 100 has been perturbed; enticing further interaction. Upward biasing of pet toy 100 also prevents liquid (e.g., drool, saliva, melted pet treat, etc.) from escaping from treat container 410 if left unused.

Figure 5:
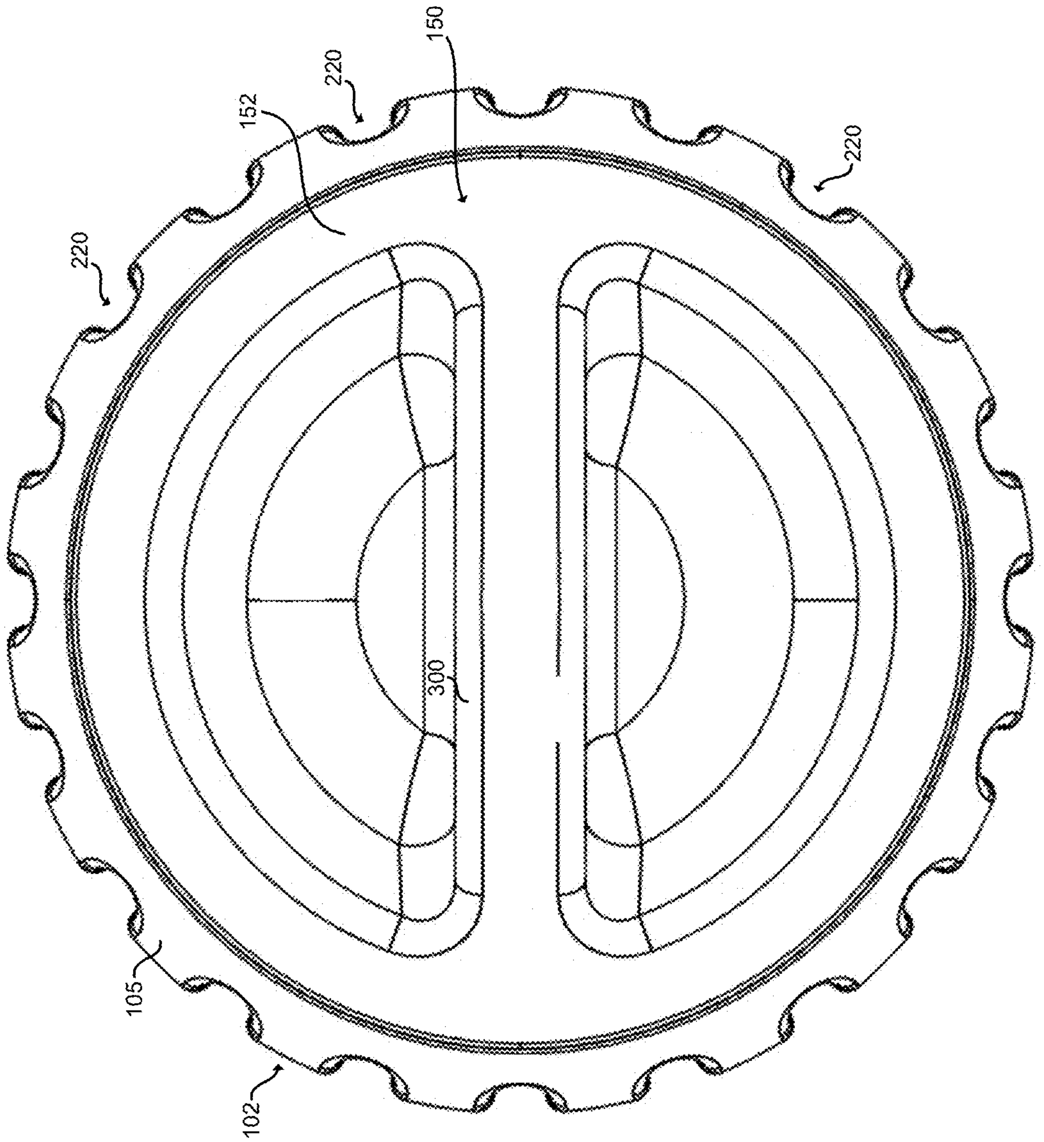
FIG. 5 is a bottom view of the pet toy in an illustrative embodiment.

FIG. 5 is a bottom view of pet toy 100 in an illustrative embodiment. As shown in FIG. 5, lower member 150 is inserted (e.g., screwed) into annular side wall 105 of upper member 102. When assembled in this manner, lower member 150 and upper member 102 are concentric cylindrical members. In one embodiment, grip 300 is dimensioned for ergonomic twisting by a human hand, and hence forms a narrow arch, which enables lower member 150 to be turned like a dial when screwed into upper member 102.

Figure 6:
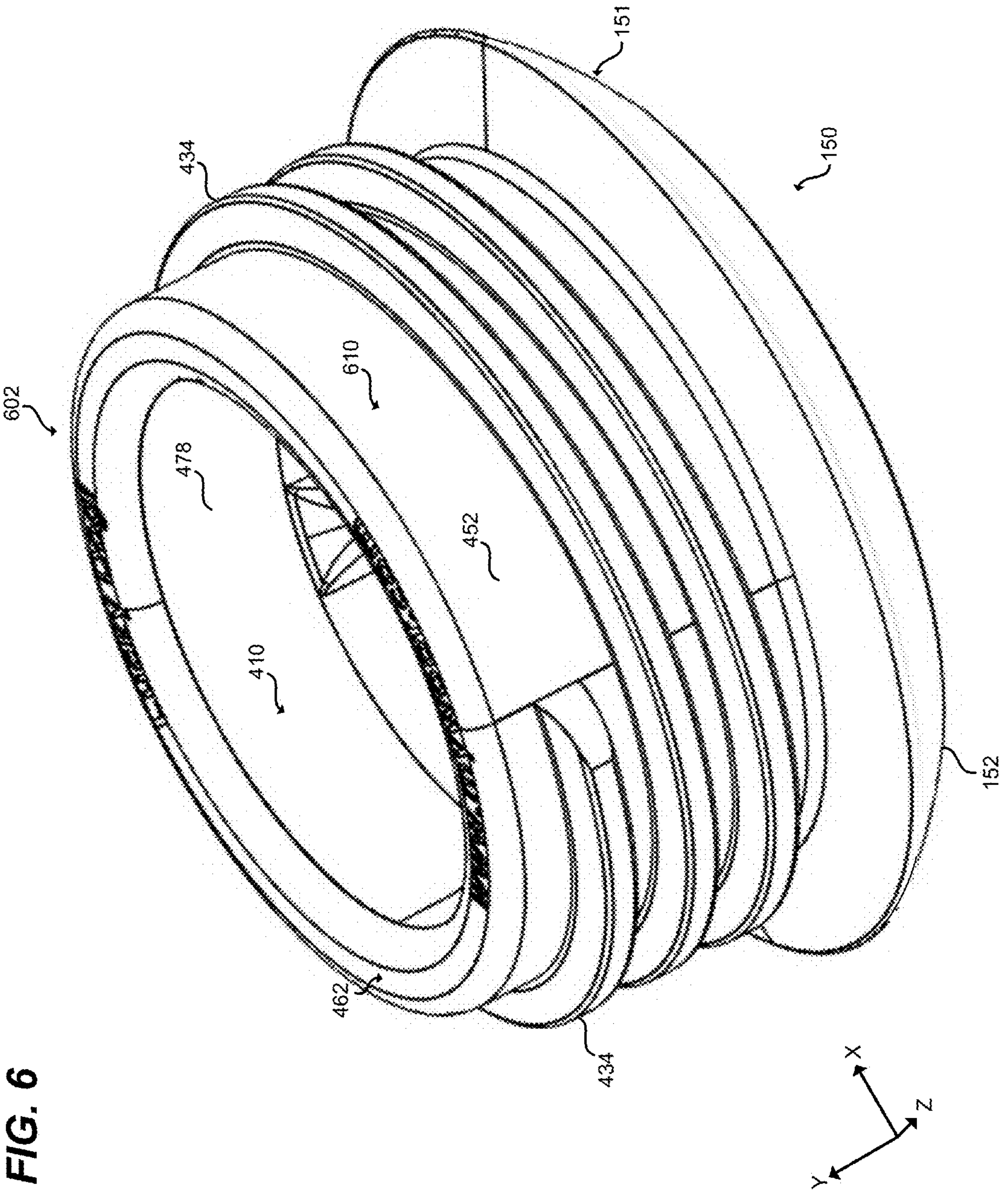
FIG. 6 is a perspective view of a lower member of the pet toy in an illustrative embodiment.
Figure 7:
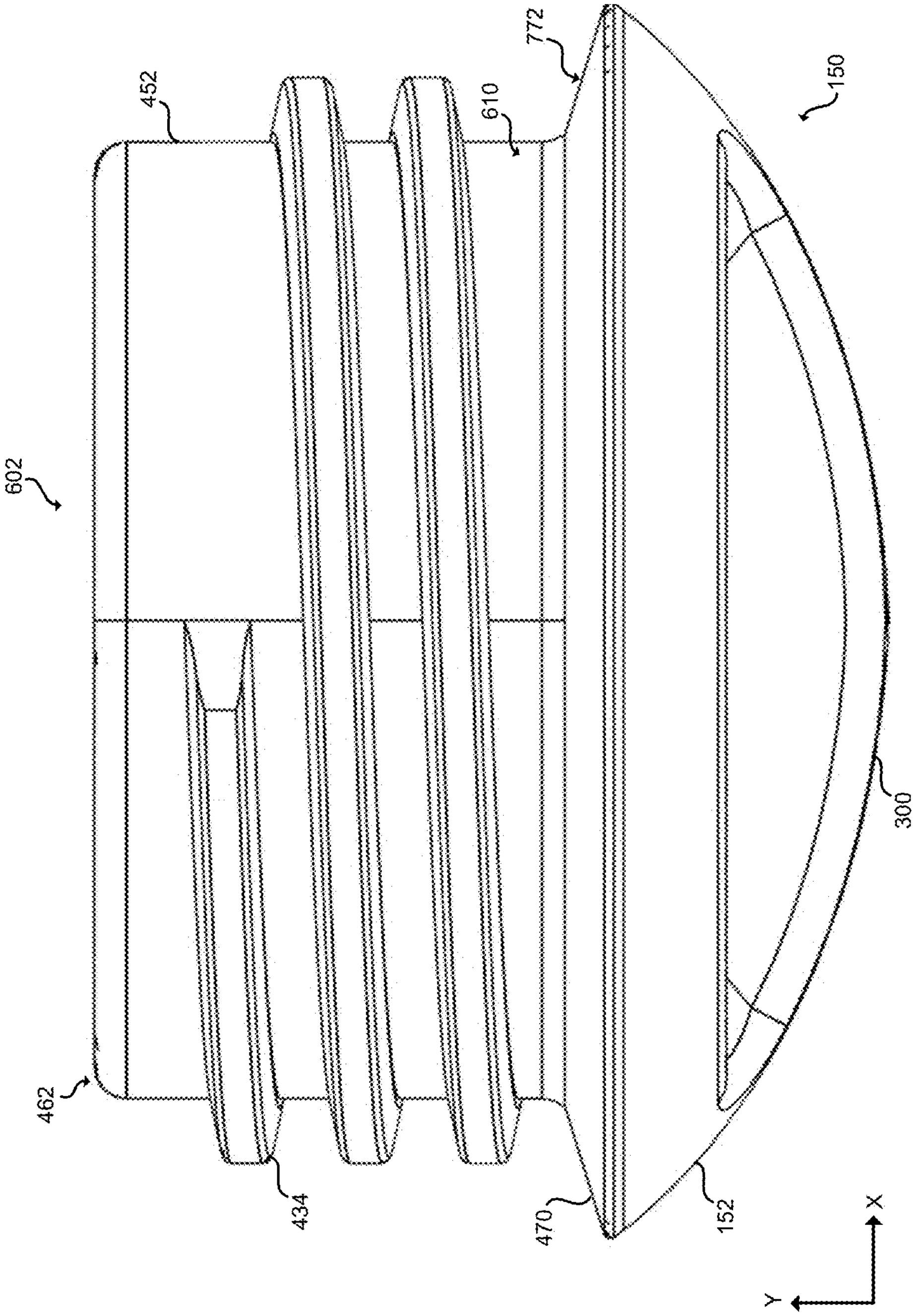
FIG. 7 is a side view of the lower member of the pet toy in an illustrative embodiment.
Figure 8:
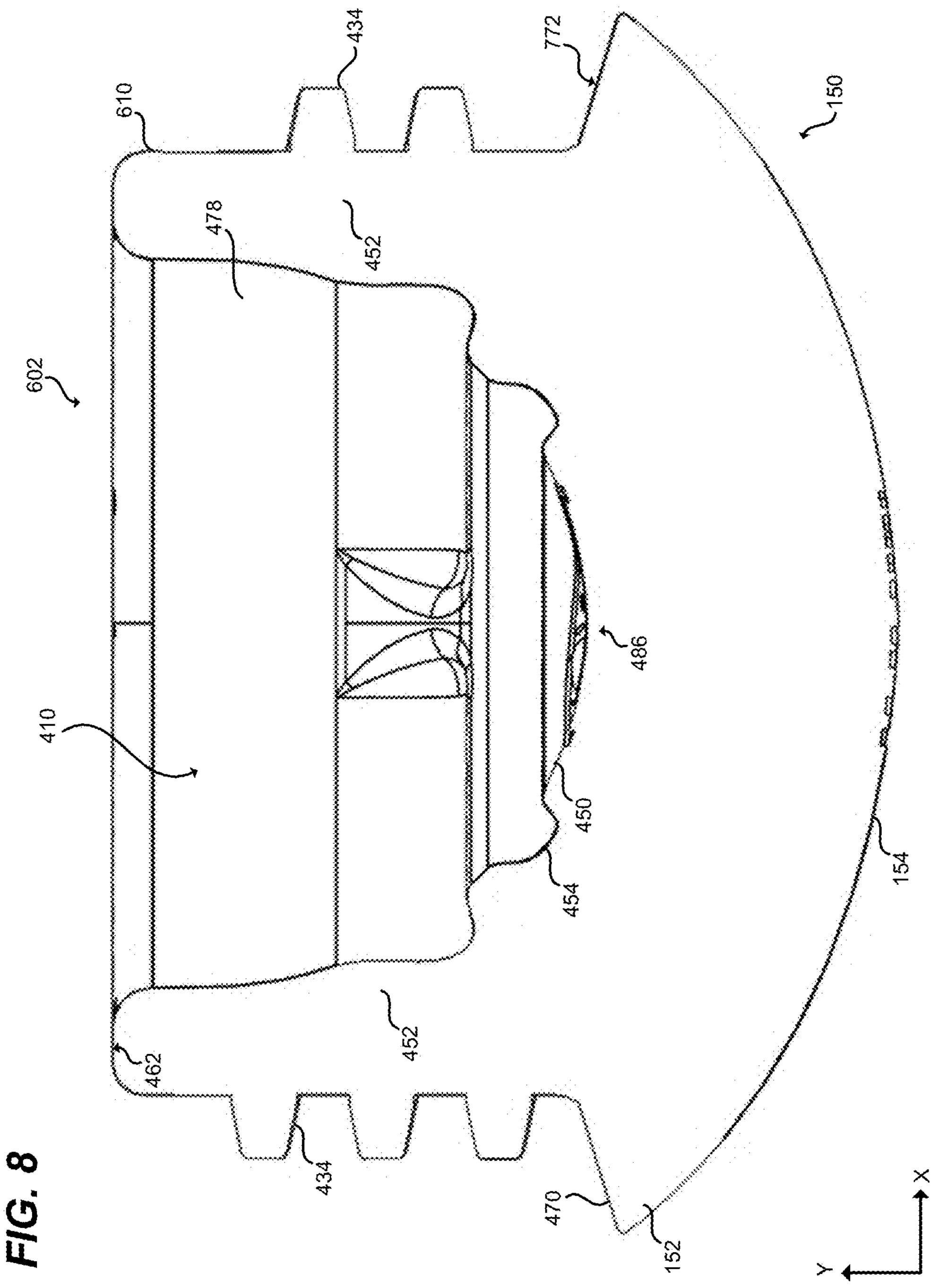
FIG. 8 is a section cut view of the lower member of the pet toy in an illustrative embodiment.

With the prior FIGS. 1-5 depicting an assembled pet toy 100 for retaining a pet treat, FIGS. 6-8 further depict lower member 150 in an illustrative embodiment.

FIG. 6 is a perspective view of lower member 150 of pet toy 100 in an illustrative embodiment. Lower member 150 is a monolithic body that includes top end 602, a bottom end 151, and an annular side wall 452 between the top end 602 and the bottom end 151. In this view, treat container 410 is defined by inner side surface 478 and inner bottom surface 486 (not visible in FIG. 6) of lower member 150. Inner side surface 478 is generally cylindrical in this embodiment, and is continuous (i.e., not including holes). Outer side surface 610 of annular side wall 452 is generally a cylindrical shape between base 152 and a top end 602 of lower member 150. In one embodiment, outer side surface 610 of annular side wall 452 may include threads 434 as a mating feature. The bottom end 151 of lower member 150 (at base 152) is closed, while top end 602 is generally open to form treat container 410. Treat container 410 extends axially downward from upper surface 462 of annular side wall 452 to inner bottom surface 486 (see FIG. 4).

FIG. 7 is a side view of lower member 150 in an illustrative embodiment, providing additional perspective on the features of lower member 150. Specifically, FIG. 7 provides further detail depicting flange 470. Flange 470 may project radially outward from outer side surface 610 of lower member 150. The upper surface 772 of flange 470 may curve or angle downward (in the Y direction) as flange 470 projects radially outward. Upper surface 772 may be configured to abut a bottom end 107 (see FIG. 1) of upper member 102 when upper member 102 and lower member 150 are assembled. FIG. 7 also illustrates that base 152 of lower member 150 may be curved or rounded axially outward.

FIG. 8 is a section cut view of lower member 150 in an illustrative embodiment, and corresponds with view arrows 4-4 of FIG. 2. As described above, inner side surface 478 extends axially downward from upper surface 462 of annular side wall 452 to inner bottom surface 486 to form treat container 410. Inner bottom surface 486 of treat container 410 may include central depression 450, and/or one or more peripheral depressions 454 arranged radially outward from central depression 450.

Figure 9:
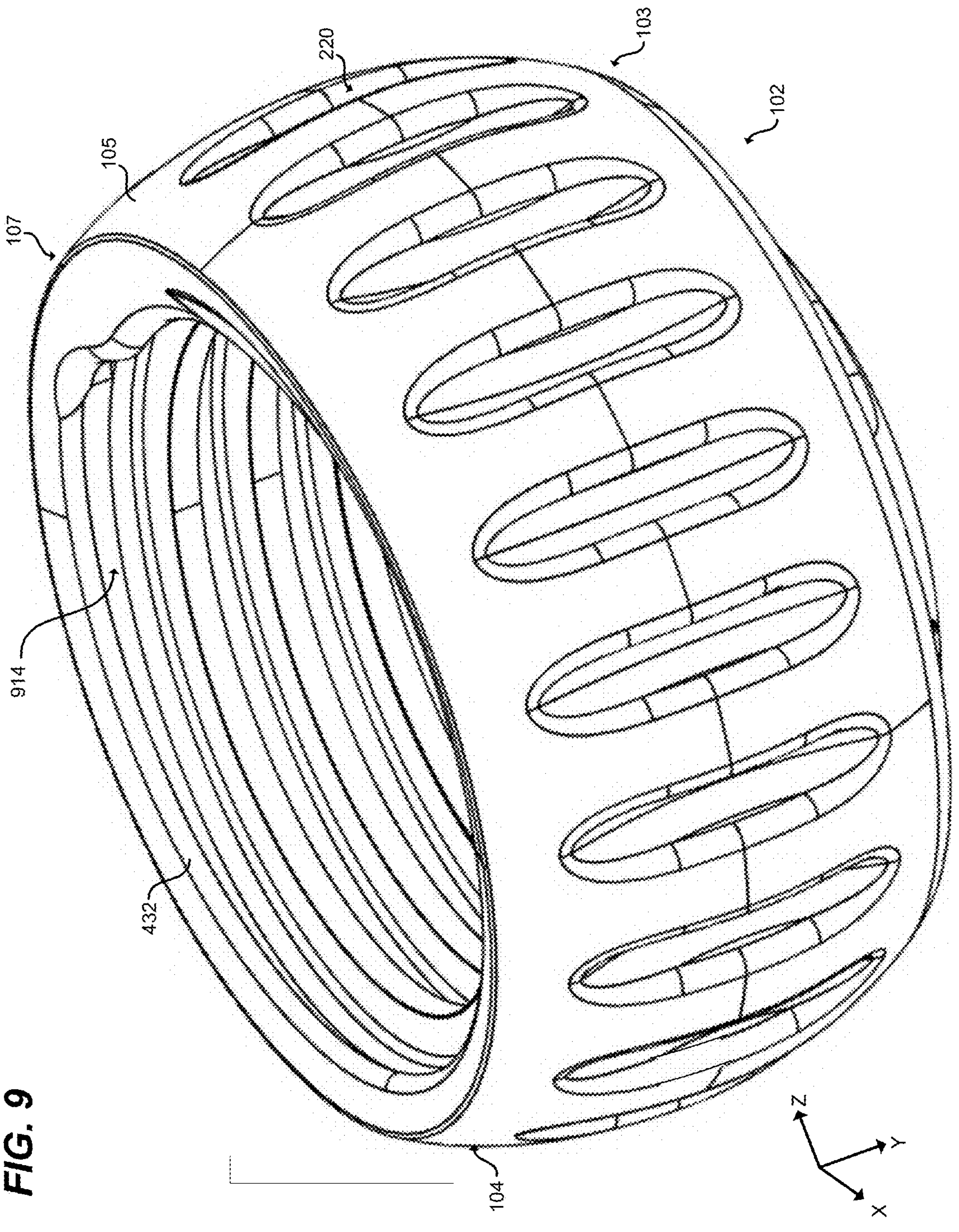
FIG. 9 is a perspective view of an upper member of the pet toy in an illustrative embodiment.
Figure 10:
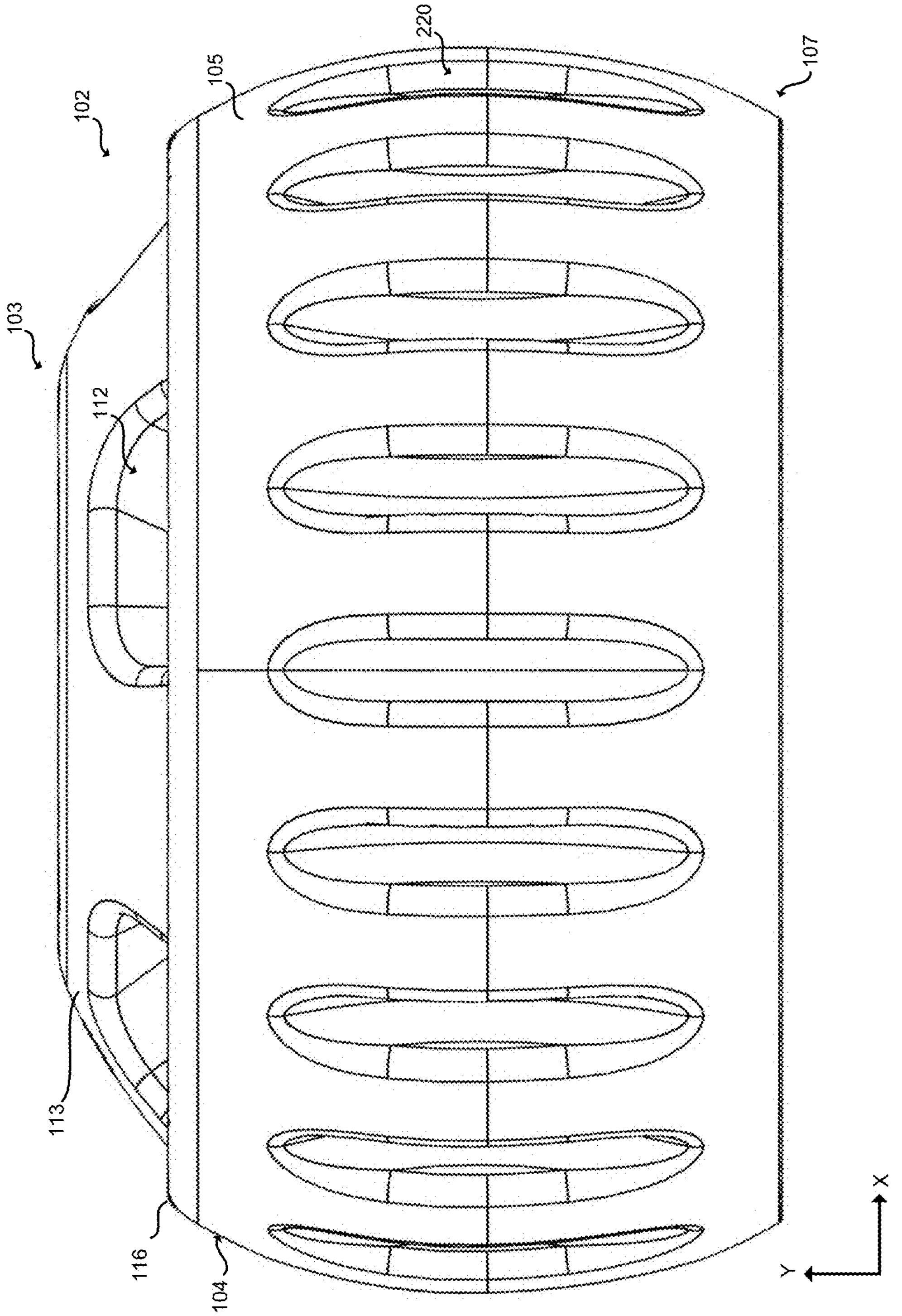
FIG. 10 is a side view of the upper member of the pet toy in an illustrative embodiment.
Figure 11:
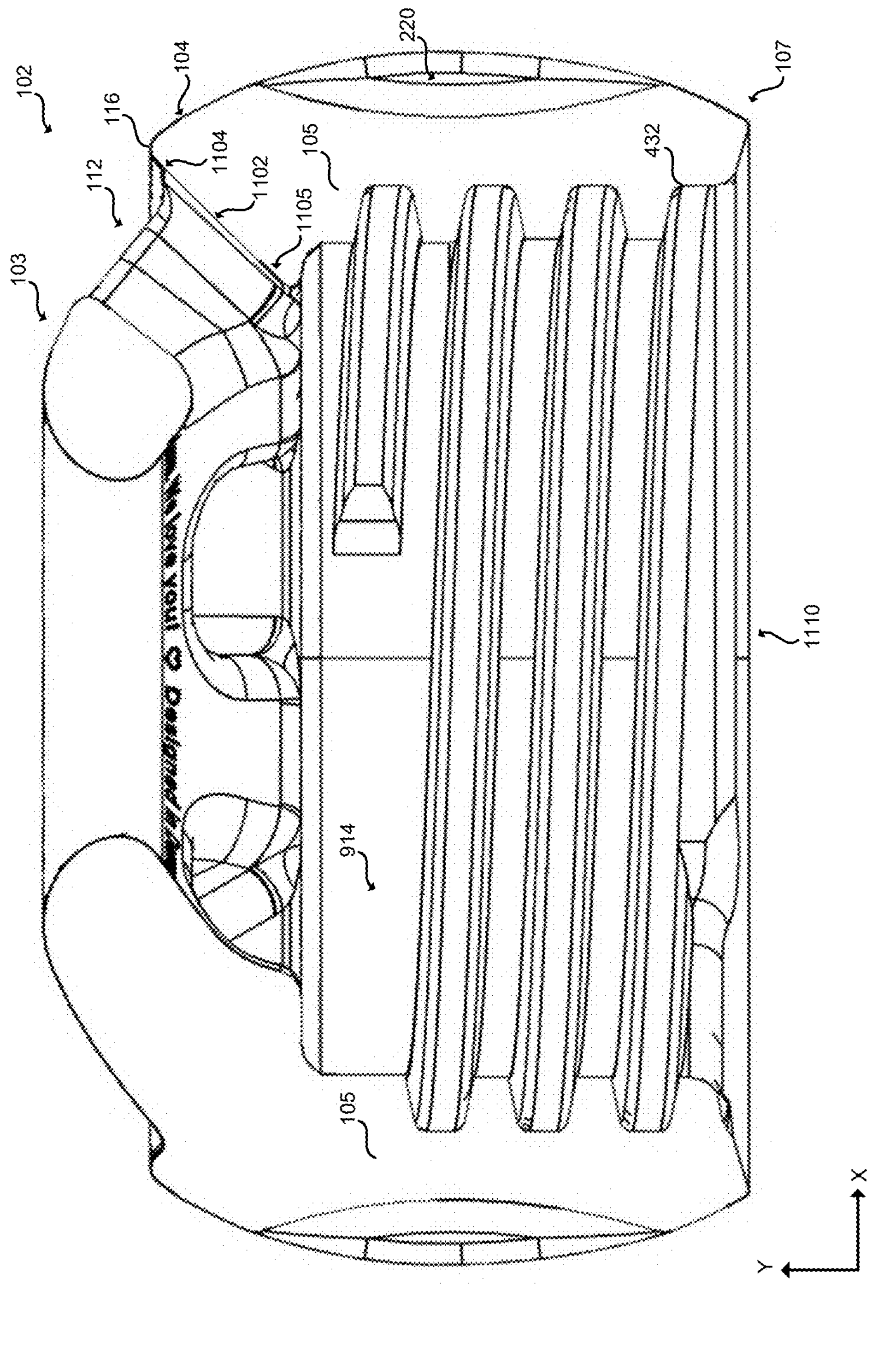
FIG. 11 is a section cut view of the upper member of the pet toy in an illustrative embodiment.

FIGS. 9-11 depict upper member 102 in an illustrative embodiment. As in FIG. 9, upper member 102 is generally a cylindrical shape between top end 103 and bottom end 107 (note that upper member 102 is flipped upside down in FIG. 9) that defines a hollow cylinder. The bottom end 107 of upper member 102 is generally open so that an interior of upper member 102 is generally hollow. In one embodiment, an inner side surface 914 of upper member 102 may include threads 432 as a mating feature.

In FIG. 10, upper member 102 is illustrated from a side view. FIG. 10 illustrates that top wall 113 of upper member 102 may be curved or rounded axially outward. Also, an annular rim 116 may project axially outward from a lower portion of vents 112 to funnel any liquid on top wall 113 toward vents 112 instead of along outer surface 104.

FIG. 11 is a section cut view of upper member 102 that corresponds with view arrows 4-4 of FIG. 2. FIG. 11 illustrates an interior portion 1110 of the upper member 102 that is generally hollow, and an inner side surface 914 of annular side wall 105 facing radially inward toward the interior portion 1110. In FIG. 11, vents 112 may include an outer radial surface 1102 that slopes or curves radially inward from annular rim 116 toward interior portion 1110. Annular rim 116 may project axially outward further than a lower portion 1105 and a radially outermost portion 1104 of vent 112. Thus, annular rim 116 obstructs saliva from traveling down outer surface 104 of upper member 102, and instead funnels the saliva or other liquid down the outer radial surface 1102 of vents 112.

Figure 12:
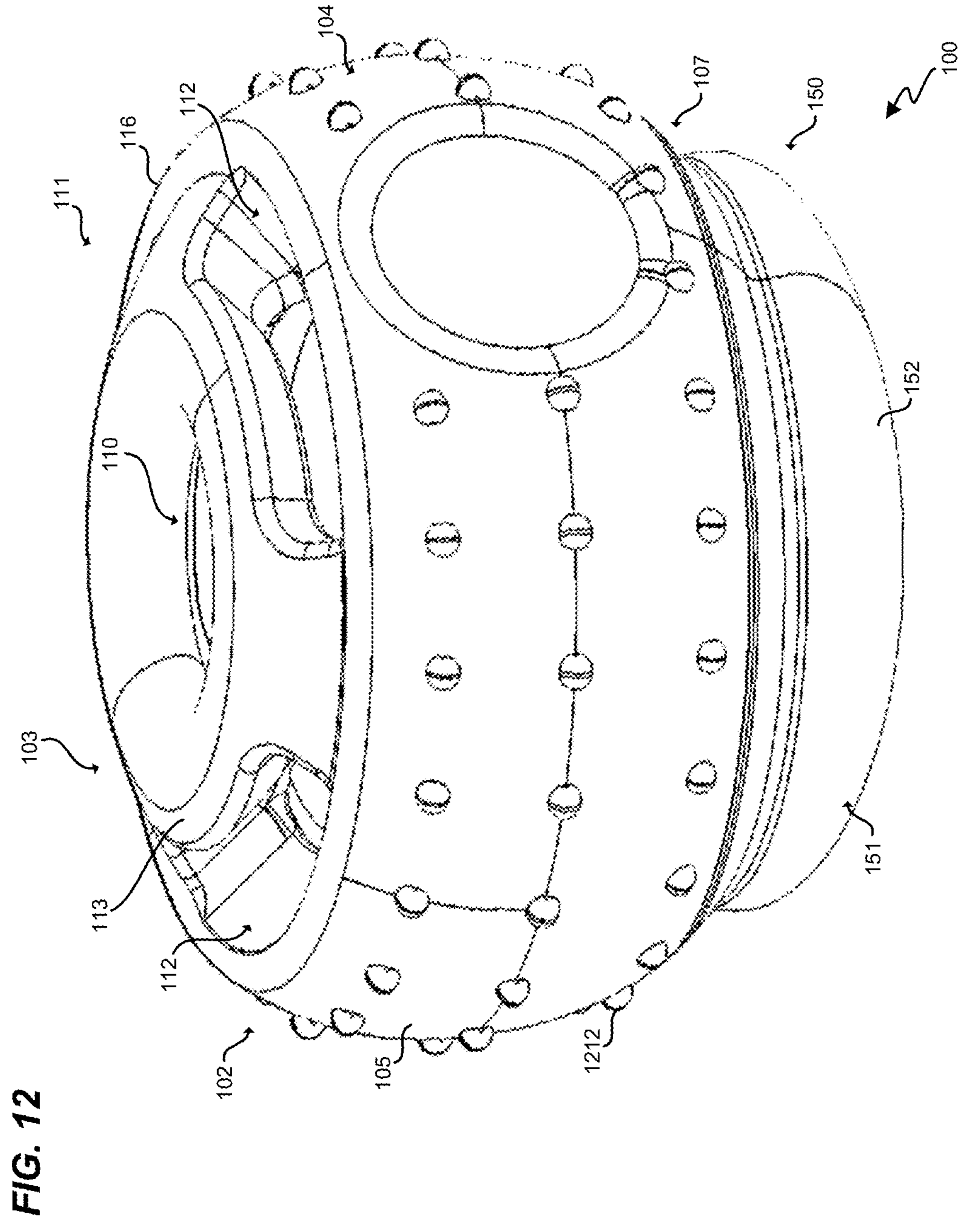
FIG. 12 is a perspective view of a pet toy in another illustrative embodiment.

FIG. 12 is a perspective view of a pet toy 100 in another illustrative embodiment. As above, pet toy 100 comprises an upper member 102 and a lower member 150 that are detachable or separable into individual components. Upper member 102 includes a top end 103, a bottom end 107, and an annular side wall 105 between the top end 103 and the bottom end 107. Bottom end 107 of upper member 102 is open to receive lower member 150 as will be described in more detail below. Top end 103 of upper member 102 is partially closed to define a treat interaction portion 111. Treat interaction portion 111 is formed by a top wall 113 on top end 103. In one embodiment, top wall 113/treat interaction portion 111 includes a treat access hole 110, and one or more vents 112.

In an embodiment, annular side wall 105 may project axially outward in relation to the top wall 113 where annular side wall 105 and the top wall 113 intersect to form an annular rim 116. Annular rim 116 slopes or curves axially inward toward vents 112 of top wall 113. Thus, annular rim 116 facilitates the redirection of saliva or drool on top wall 113 toward vents 112. In addition to preventing a suction lock, vents 112 also function as an inlet for saliva or drool into an interior portion of pet toy 100.

FIG. 12 further illustrates that annular side wall 105 may include one or more bumps 1212 that project radially outward from outer surface 104. Bumps 1212 are surface features, as an alternative or addition to grooves 220 shown in FIG. 2, that facilitate gripping of pet toy 100 by a human.

Lower member 150 is generally cylindrical in shape. Lower member 150 comprises a top end (not visible in FIG. 1), a bottom end 151 opposite the top end that is closed at a base 152, and an annular side wall (not visible in FIG. 1) between the top end and the bottom end 151. Base 152 of lower member 150 represents the bottom of pet toy 100 that rests on a floor when pet toy 100 is oriented upright with top end 103 facing upward. As will be described in more detail below, an interior portion of lower member 150 forms a treat container. In an embodiment, base 152 is curved or rounded axially outward or generally has a spherical or rounded outline, which enables pet toy 100 to roll when dropped or thrown.

Figure 13:
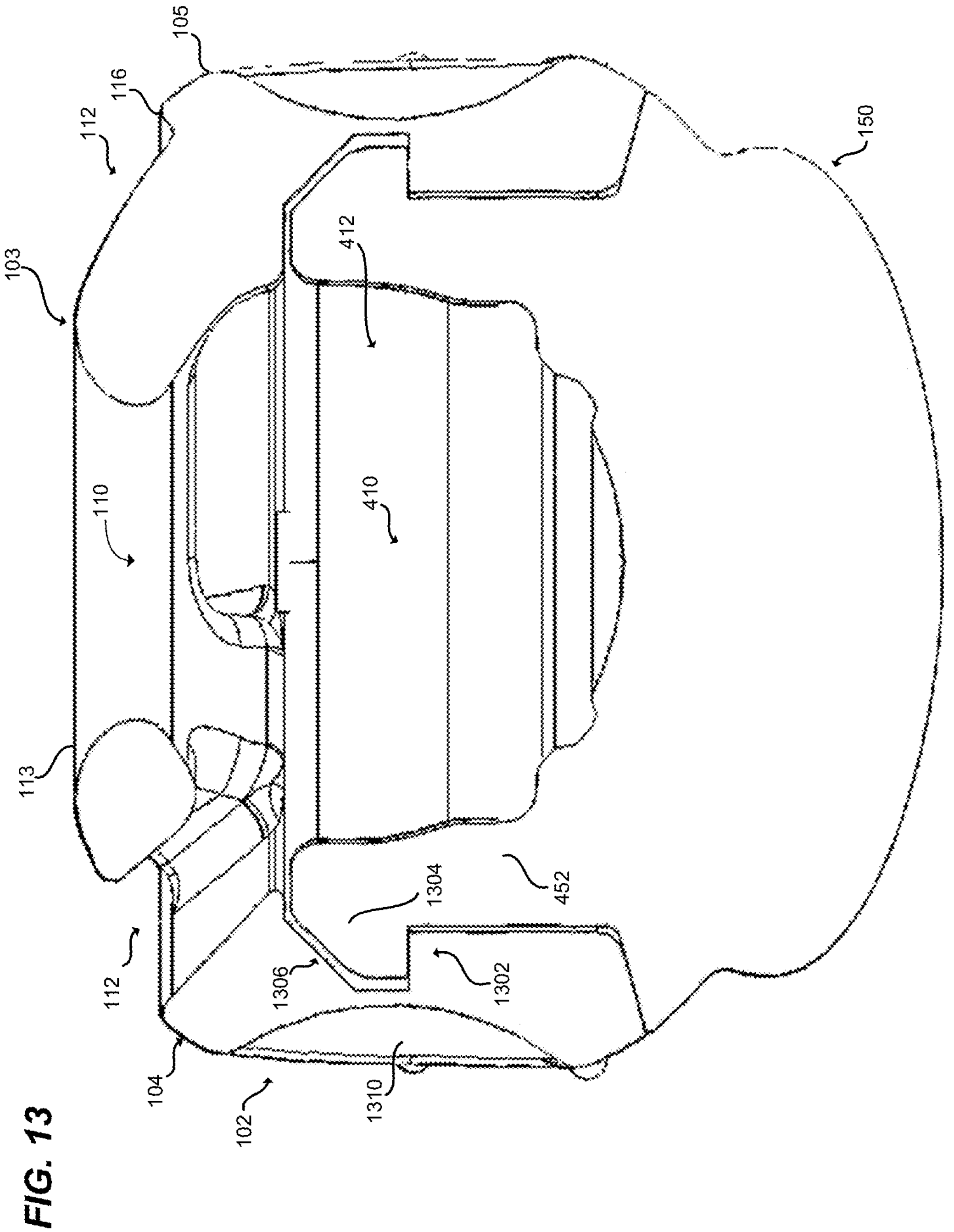
FIG. 13 is a section cut view of a pet toy in another illustrative embodiment.

FIG. 13 is a section cut view of pet toy 100 in an illustrative embodiment. In an embodiment, where annular side wall 105 and top wall 113 of upper member 102 intersect, annular side wall 105 may extend or project axially outward from top wall 113 to form annular rim 116. Annular rim 116 may slope or curve radially inwards towards the vents 112, which provides a technical benefit by capturing and re-directing saliva that is flowing along top wall 113. Annular rim 116 redirects the saliva into an interior portion 412 of pet toy 100 and into a treat container 410 that contains the pet treat, instead of onto the outer surface 104 of upper member 102. Treat container 410 is configured to hold or contain liquid so the saliva is contained within pet toy 100 resulting in less of a mess. This also prevents the outer surface 104 from becoming overly slick, which may interfere with the disassembly of pet toy 100, as well as the handling of pet toy 100 when used as a ball or toy.

FIG. 13 depicts the annular side wall 452 of lower member 150 in an illustrative embodiment. The annular side wall 452 of lower member 150 is generally cylindrical and dimensioned to mate (i.e., fit into) with annular side wall 105 of upper member 102. In one embodiment, a clip mechanism 1302 may define the mating features of upper member 102 and lower member 150. For clip mechanism 1302, annular side wall 452 of lower member 150 may include one or more tab members 1304 that project radially outward from an outer side surface of annular side wall 452. For example, a tab member 1304 may be an annular tab member disposed around the circumference of annular side wall 452. Alternatively, one or more tab members 1304 may be spaced around the circumference of annular side wall 452 (e.g., a pair of tab members 1304 disposed on radially-opposite sides of lower member 150). Annular side wall 105 of upper member 102 may include one or more notches 1306 or indentations. In this embodiment, a tab member 1304 is dimensioned to mate with a notch 1306 when lower member 150 is pressed into upper member 102. Upper member 102 may further include one or more detents 1310 configured to facilitate engagement/disengagement of a tab member 1304 with a notch 1306.

Figure 14:
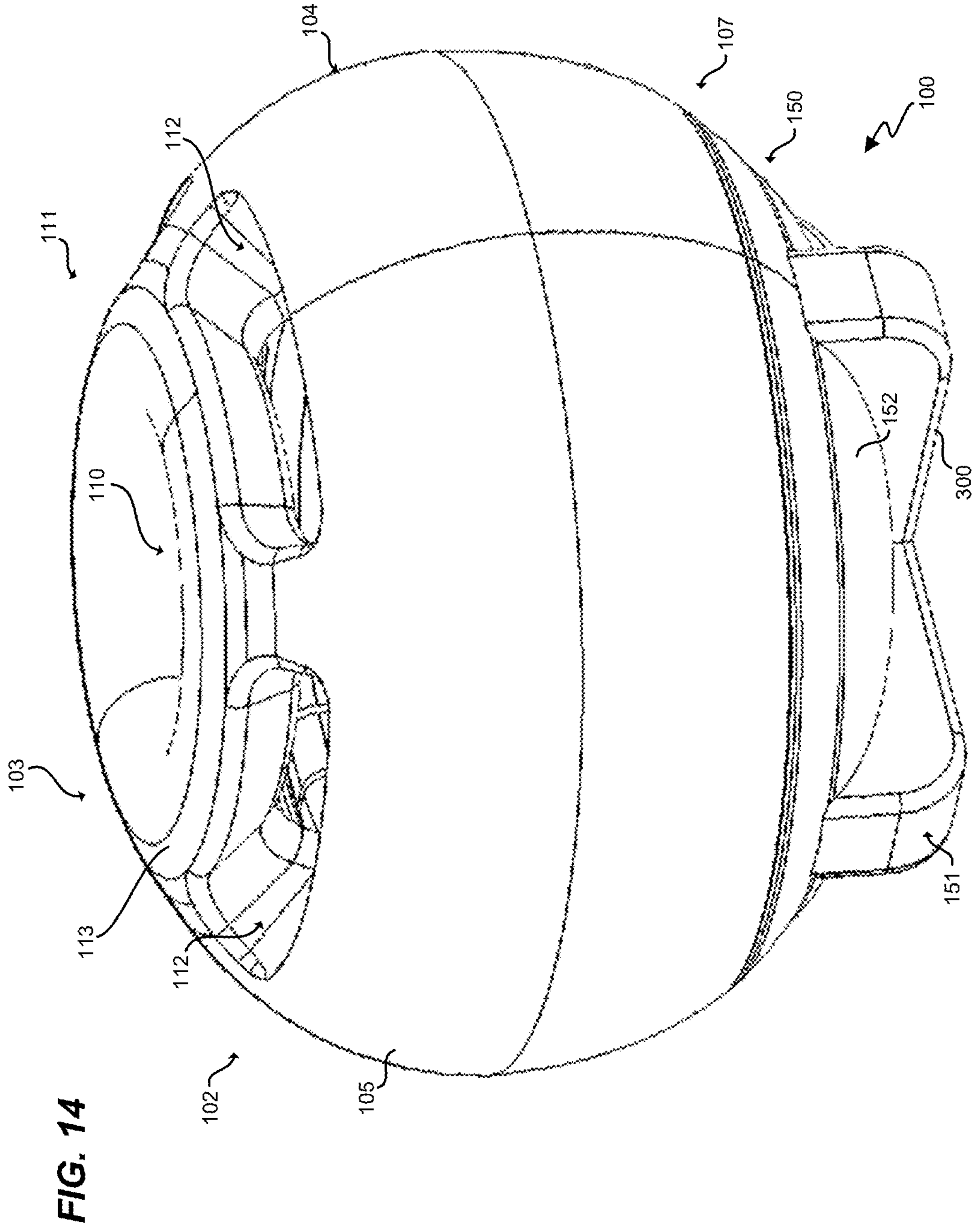
FIG. 14 is a perspective view of a pet toy in another illustrative embodiment.

FIG. 14 is a perspective view of a pet toy 100 in another illustrative embodiment. As above, pet toy 100 comprises an upper member 102 and a lower member 150 that are detachable or separable into individual components. Upper member 102 includes a top end 103, a bottom end 107, and an annular side wall 105 between the top end 103 and the bottom end 107. Bottom end 107 of upper member 102 is open to receive lower member 150 as will be described in more detail below. Top end 103 of upper member 102 is partially closed to define a treat interaction portion 111. Treat interaction portion 111 is formed by a top wall 113 on top end 103. In one embodiment, top wall 113/treat interaction portion 111 includes a treat access hole 110, and one or more vents 112. In the embodiment of FIG. 14, the outer surface 104 of annular side wall 105 may be generally smooth.

Lower member 150 is generally cylindrical in shape. Lower member 150 comprises a top end (not visible in FIG. 1), a bottom end 151 opposite the top end that is closed at a base 152, and an annular side wall (not visible in FIG. 1) between the top end and the bottom end 151. As will be described in more detail below, an interior portion of lower member 150 forms a treat container. In an embodiment, base 152 may include a grip 300 dimensioned for a human hand, and the design of grip 300 may vary from the design illustrated in FIG. 14, such as in FIG. 5.

Figure 15:
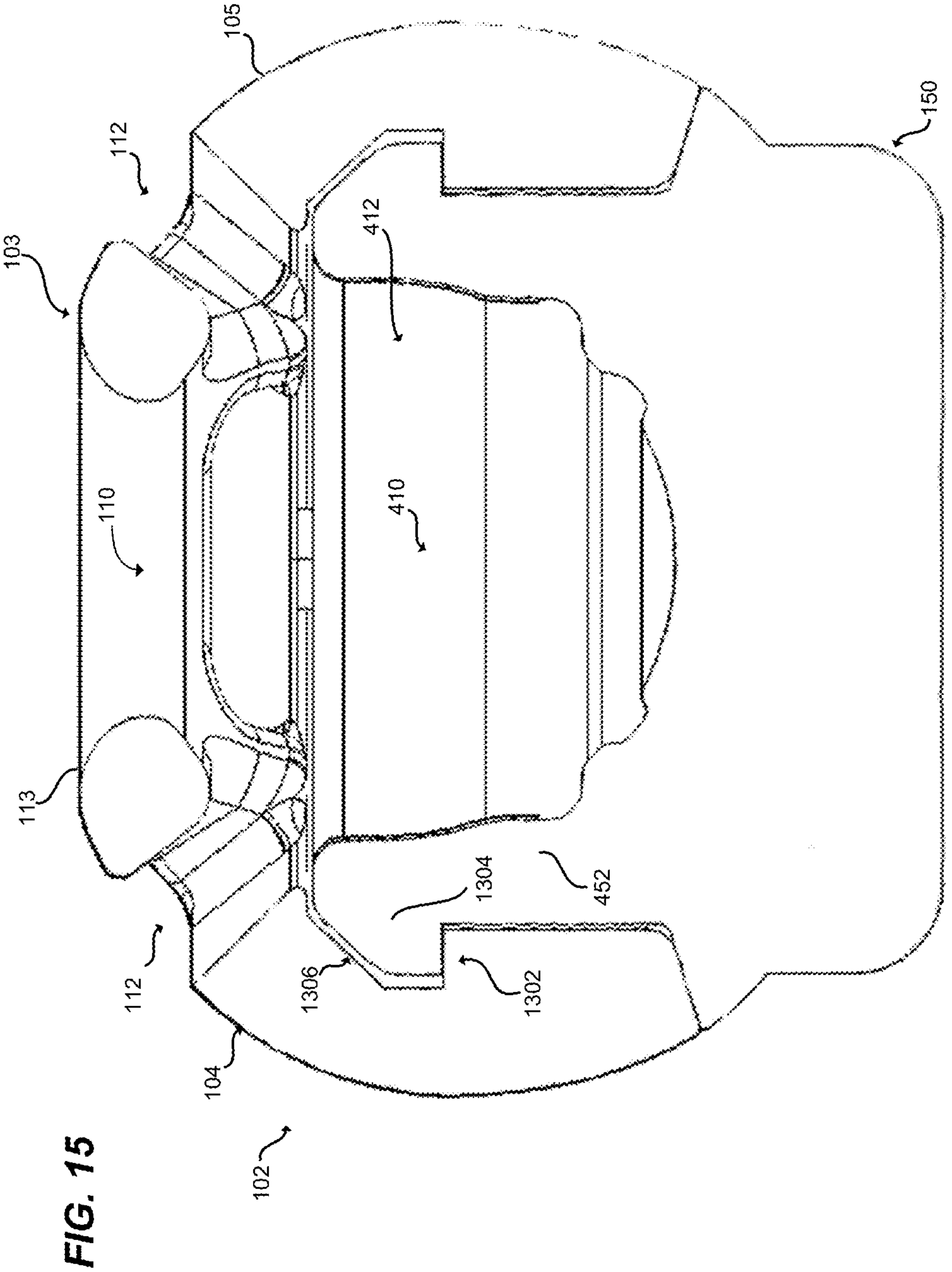
FIG. 15 is a section cut view of a pet toy in another illustrative embodiment.

FIG. 15 is a section cut view of pet toy 100 in an illustrative embodiment. FIG. 15 depicts the annular side wall 452 of lower member 150 in an illustrative embodiment. The annular side wall 452 of lower member 150 is generally cylindrical and dimensioned to mate (i.e., fit into) with annular side wall 105 of upper member 102. In one embodiment, a clip mechanism 1302 may define the mating features of upper member 102 and lower member 150. For clip mechanism 1302, annular side wall 452 of lower member 150 may include one or more tab members 1304 that project radially outward from an outer side surface of annular side wall 452. Annular side wall 105 of upper member 102 may include one or more notches 1306 or indentations. In this embodiment, a tab member 1304 is dimensioned to mate with a notch 1306 when lower member 150 is pressed into upper member 102.

One or more of the features disclosed above for pet toy 100 may be combined as desired.

Figure 16:
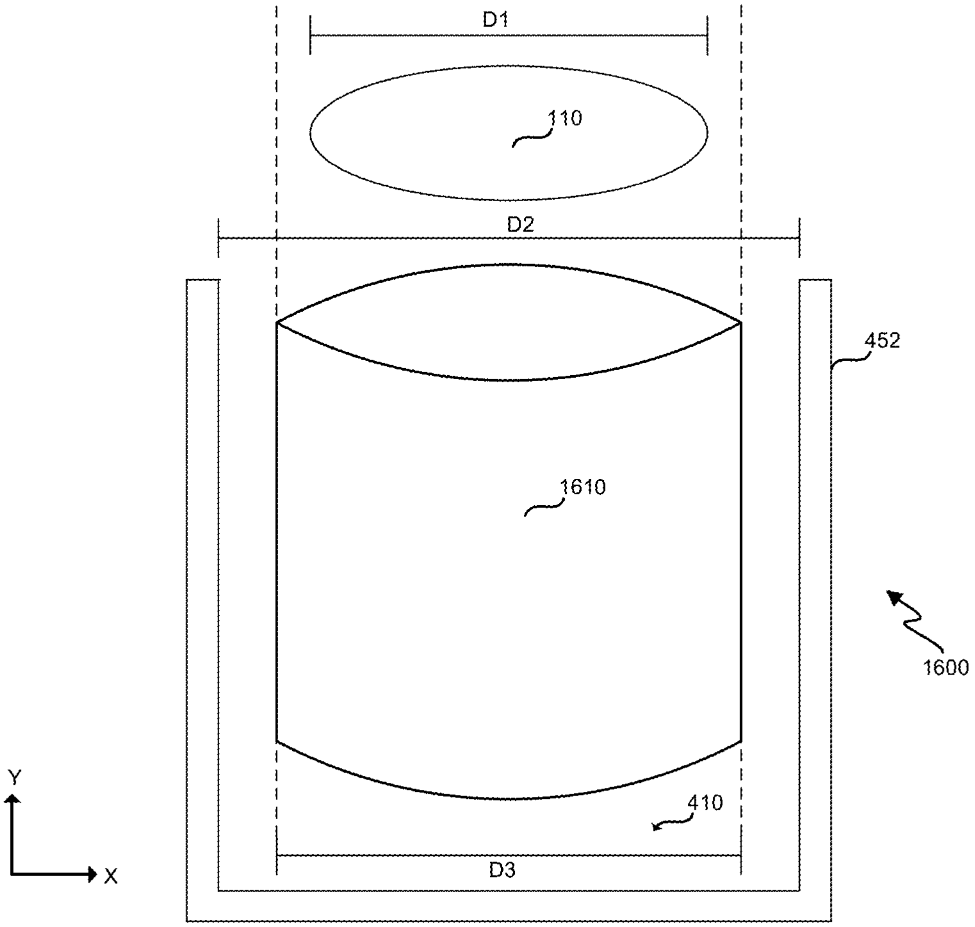
FIG. 16 is a block diagram depicting a relationship of dimensions between a treat access hole, a pet treat, and a treat container in an illustrative embodiment.

FIG. 16 is a block diagram 1600 depicting a relationship of dimensions between treat access hole 110, a pet treat 1610, and treat container 410 in an illustrative embodiment. Pet treat 1610 may comprise any suitable material that is readily consumable by a pet. Depending on the embodiment, pet treat 1610 may be non-spherical. For example, pet treat 1610 may have an ovoid, cylindrical, or non-uniform shape. In some embodiments, pet treat 1610 may comprise a paste, condensed food item, freeze dried item, frozen item, etc. Furthermore, in some embodiments, pet treat 1610 exhibits visoelastic properties, and is capable of being slowly abraded or otherwise scraped away via interaction with a tongue of the pet.

FIG. 16 illustrates that the dimensions of treat access hole 110, treat container 410, and pet treat 1610 may be carefully selected. That is, dimension D1 of treat access hole 110, comprising a widest or largest dimension of treat access hole 110, is smaller than a dimension D3 corresponding with a width of pet treat 1610 in the X direction. Similarly, dimension D3 is smaller than dimension D2, which is a width of treat container 410. These relationships in dimension provide a technical benefit by ensuring that the pet treat 1610 is capable of being held within treat container 410, and yet restricting the pet treat 1610 from being dropped or pulled through treat access hole 110. Thus, pet treat 1610 cannot be removed or dispensed via treat access hole 110.

Figure 17:
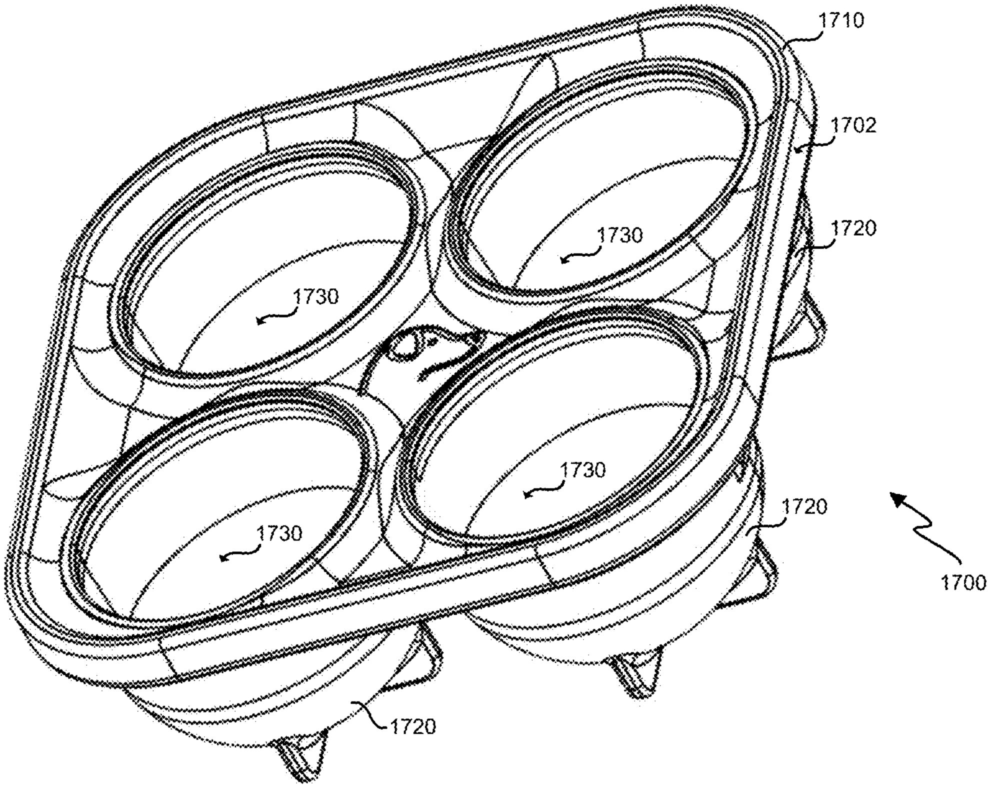
FIG. 17 is a perspective view of a mold for pet treats in an illustrative embodiment.

With a discussion of variations of an apparatus for retaining pet treat described above, FIGS. 17-19 depict a mold for fabricating pet treats 1610 that may be stored within pet toy 100. FIG. 17 is a perspective view of a mold 1700 for pet treats in an illustrative embodiment. For example, mold 1700 may be utilized to shape a food putty or paste, and/or for maintaining the shape of such a food putty or paste during freezing. In this embodiment, mold 1700 includes a body 1710, which unites compartments 1720. Each compartment 1720 defines a well 1730 or cup for receiving an edible material that may be shaped into a pet treat 1610. The mold 1700 may be made from a material 1702, such as a rubber or silicone rubber. The use of a flexible material provides a technical benefit by facilitating deformation of the mold 1700 to release pet treats 1610 from the wells 1730.

Figure 18:
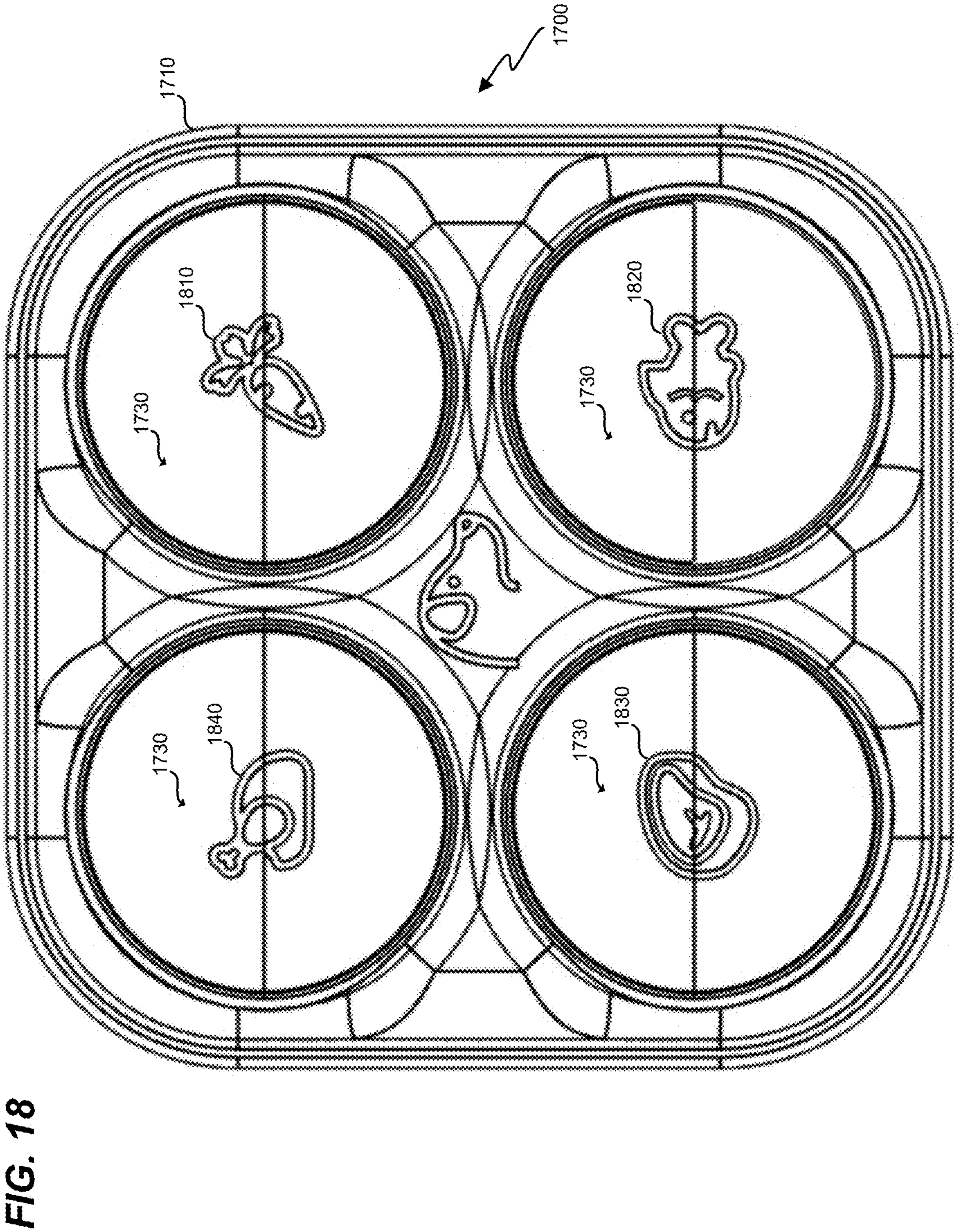
FIG. 18 is a top view of the mold in an illustrative embodiment.

FIG. 18 is a top view of mold 1700 in an illustrative embodiment. In this embodiment, a base of each compartment 1720 may be stamped with an indicator referring to a type of edible material, such as indicator 1810 for vegetable material, an indicator 1820 for fish material, an indicator 1830 for beef material, and/or an indicator 1840 for poultry material.

Figure 19:
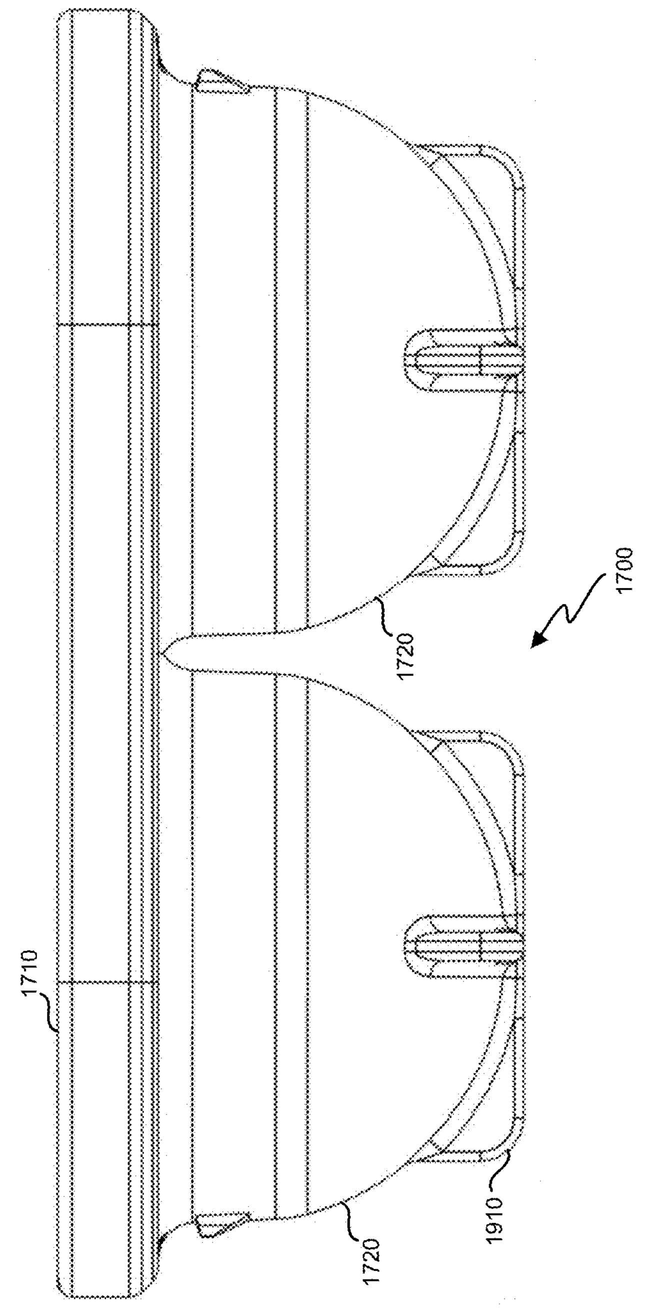
FIG. 19 is a side view of the mold in an illustrative embodiment.

FIG. 19 is a side view of mold 1700 in an illustrative embodiment, and is provided to add further context. For example, FIG. 19 further illustrates stabilizers 1910 attached to each compartment 1720. Stabilizers 1910 provide a technical benefit by helping to keep the mold 1700 level, which facilitates retention of food articles that are still being shaped (e.g., being frozen) at the mold 1700.

Figure 20:
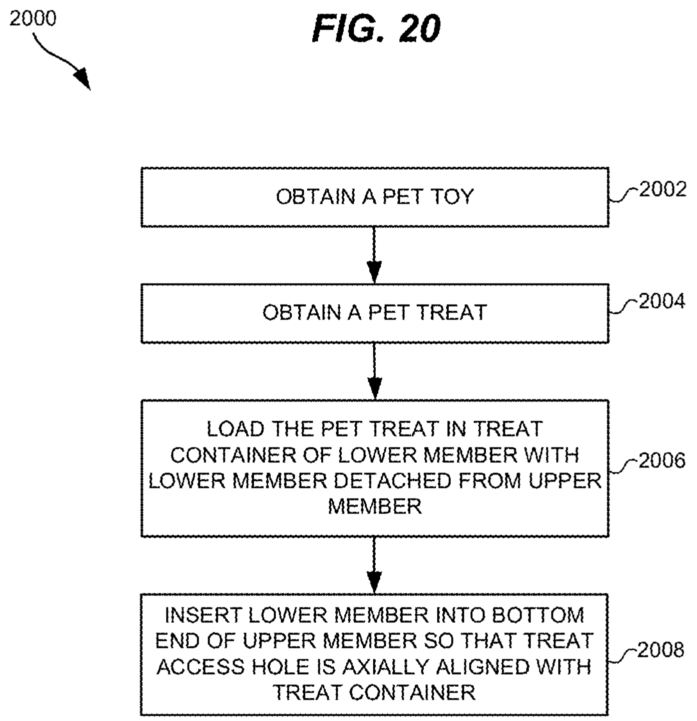
FIG. 20 is a flow chart illustrating a method of occupying a pet in an illustrative embodiment.

FIG. 20 is a flow chart illustrating a method 2000 of occupying a pet in an illustrative embodiment. The steps of the flow charts described herein are not all inclusive and may include other steps not shown, and the steps may be performed in an alternative order. Method 2000 includes obtaining a pet toy 100 as described above (step 2002). Method 2000 further includes obtaining a pet treat 1610 (step 2004). The pet treat 1610 has a larger size than the treat access hole 110 of pet toy 100. Method 2000 further includes loading the pet treat 1610 in treat container 410 of lower member 150 with lower member 150 detached from upper member 102 (step 2006). Method 2000 further includes inserting (e.g., screwing, twisting, pressing, etc.) lower member 150 into the bottom end 107 of upper member 102 so that treat access hole 110 is facing toward (or axially aligned with) treat container 410 (step 2008). The top wall 113 of upper member 102 traps the pet treat 1610 in treat container 410 while providing/allowing access to the pet treat 1610 through treat access hole 110.

Although specific embodiments were described herein, the scope of the disclosure is not limited to those specific embodiments. The scope of the disclosure is defined by the following claims and any equivalents thereof.

What is claimed is:

1. A pet toy, comprising:
- a cylindrical main body member, comprising:
  - a top end, comprising a top wall, the top wall comprising:
    - a treat access hole; and
    - one or more vents;
  - a bottom end that is open, disposed opposite the top end; and
  - an annular side wall, disposed between the top end and the bottom end;
- a core member, configured to assemble to the cylindrical main body member and comprising:
  - a top end that is open;
  - a bottom end that is closed at a base, disposed opposite the top end; and
  - an annular side wall, disposed between the top end and the bottom end; and
- a treat container, disposed within an interior portion of the pet toy and configured to contain a pet treat,
- wherein the treat access hole faces toward the treat container when the core member is assembled to the cylindrical main body member, and
- wherein the annular side wall and the top wall intersect to form an annular rim about the circumference of the annular side wall, the annular rim sloping or curving axially inward and thereby defining an annular trough about the circumference of the annular side wall.

2. The pet toy of claim 1, wherein the treat access hole is radially centered on the top wall of the cylindrical main body member and the one or more vents are disposed radially outward from the treat access hole.

3. The pet toy of claim 1, wherein the annular side wall projects axially outward in relation to the top wall where the annular side wall and the top wall intersect to form the annular rim.

4. The pet toy of claim 1, wherein the cylindrical main body member further comprises a plurality of grooves disposed axially along the annular side wall.

5. The pet toy of claim 1, wherein the treat container is generally bowl-shaped.

6. The pet toy of claim 1, wherein contact between the cylindrical main body member and the core member forms a liquid-tight seal between the cylindrical main body member and the core member when the core member is assembled to the cylindrical main body member.

7. The pet toy of claim 1, wherein the base comprises an annular flange that abuts the bottom end of the cylindrical main body member when the core member is assembled to the cylindrical main body member.

8. The pet toy of claim 1, wherein each of the top wall of the cylindrical main body member and the base of the core member is rounded axially outward.

9. The pet toy of claim 1, wherein a center of gravity of the pet toy is disposed closer to the base than to top end of the cylindrical main body member to bias the top wall of the cylindrical main body member upward.

10. The pet toy of claim 1, wherein the core member further comprises a grip, disposed on the base and configured to be grasped by a human hand.

11. The pet toy of claim 1, wherein the treat container is radially defined and encircled by one or both of the annular side wall of the cylindrical main body member and the annular side wall of the core member.

12. The pet toy of claim 1, wherein the treat container comprises an inner side surface and an inner bottom surface.

13. The pet toy of claim 12, wherein the inner side surface and the inner bottom surface are devoid of holes such that the treat container is configured to contain a liquid.

14. The pet toy of claim 1, wherein each of the annular side wall of the cylindrical main body member and the annular side wall of the core member comprises mating features on a side surface thereof, wherein the mating features of the cylindrical main body member and the mating features of the core member are dimensioned to mate with each other when the core member is assembled to the cylindrical main body member.

15. The pet toy of claim 14, wherein the mating features of the cylindrical main body member and the mating features of the core member are threads.

16. The pet toy of claim 1, wherein the treat access hole of the top wall of the cylindrical main body member is the only treat access hole of the cylindrical main body member and the core member.

17. The pet toy of claim 1, wherein the treat access hole of the top wall intersects a centerline axis of the pet toy.

18. A kit, comprising:
- the pet toy of claim 1; and
- a mold, configured to shape the pet treat such that a width of the pet treat is larger than a widest or largest dimension of the treat access hole but no larger than a width of the treat container.

19. A method for occupying a pet, comprising:
- loading a pet treat into the treat container of the pet toy of claim 1; and
- assembling the core member of the pet toy to the cylindrical main body member of the pet toy so that the treat access hole faces toward the treat container,
- wherein the top wall of the cylindrical main body member traps the pet treat in the treat container while providing access to the pet treat through the treat access hole.

20. The method of claim 19, wherein:
- each of the annular side wall of the cylindrical main body member and the annular side wall of the core member comprises mating features on a side surface thereof, the mating features of the cylindrical main body member and the mating features of the core member are dimensioned to mate with each other when the core member is assembled to the cylindrical main body member, and the assembling step comprises screwing or twisting the core member into the bottom end of the cylindrical main body member to cause the mating features of the cylindrical main body member and the mating features of the core member to mate.

* * * * *